(12) United States Patent
Kim et al.

(10) Patent No.: US 9,813,118 B2
(45) Date of Patent: Nov. 7, 2017

(54) METHOD AND APPARATUS FOR NETWORK COMMUNICATION IN WIRELESS POWER TRANSMISSION SYSTEM

(71) Applicant: Samsung Electronics Co., Ltd., Suwon-si (KR)

(72) Inventors: Nam Yun Kim, Seoul (KR); Hyuk Choon Kwon, Seoul (KR); Sang Wook Kwon, Seongnam-si (KR); Chi Hyung An, Suwon-si (KR); Soo Yeon Jung, Seoul (KR); Hee Won Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 457 days.

(21) Appl. No.: 14/247,899

(22) Filed: Apr. 8, 2014

(65) Prior Publication Data
US 2015/0022011 A1    Jan. 22, 2015

(30) Foreign Application Priority Data
Jul. 17, 2013    (KR) .......................... 10-2013-0084108

(51) Int. Cl.
*H04B 5/00*    (2006.01)
*H02J 5/00*    (2016.01)
*H02J 13/00*    (2006.01)

(52) U.S. Cl.
CPC ............ *H04B 5/0037* (2013.01); *H02J 5/005* (2013.01); *H02J 13/00* (2013.01); *H04B 5/0075* (2013.01)

(58) Field of Classification Search
CPC ..... H04B 5/0037; H04B 5/0075; H02J 13/00; H02J 5/005

USPC ........................................................ 307/104
See application file for complete search history.

(56) References Cited

U.S. PATENT DOCUMENTS

| | | | |
|---|---|---|---|
| 9,288,837 B2 * | 3/2016 | Yanagihara | H04W 84/20 |
| 2009/0058361 A1 * | 3/2009 | John | A61N 1/3785 |
| | | | 320/128 |
| 2011/0053493 A1 | 3/2011 | Yanagihara | |
| 2011/0127952 A1 | 6/2011 | Walley et al. | |
| 2011/0130093 A1 | 6/2011 | Walley et al. | |
| 2011/0142150 A1 | 6/2011 | Anigstein et al. | |

(Continued)

FOREIGN PATENT DOCUMENTS

| | | |
|---|---|---|
| KR | 10-2011-0016961 A | 2/2011 |
| KR | 10-2011-0069264 A | 6/2011 |

(Continued)

OTHER PUBLICATIONS

International Search Report issued on Jun. 16, 2014, in counterpart International Application No. PCT/KR2014/001748 (4 pages, in English).

(Continued)

*Primary Examiner* — Rexford Barnie
*Assistant Examiner* — Toan Vu
(74) *Attorney, Agent, or Firm* — NSIP Law

(57) ABSTRACT

A method of configuring a network of a power transmitting unit (PTU) includes determining whether a neighboring PTU is operating in a master mode; determining an operation mode of a PTU based on a result of the determining; and setting a network between the PTU and the neighboring PTU based on the operation mode of the PTU.

18 Claims, 21 Drawing Sheets

(56) References Cited

U.S. PATENT DOCUMENTS

| | | |
|---|---|---|
| 2011/0149788 A1 | 6/2011 | Chuang et al. |
| 2011/0149818 A1 | 6/2011 | Choi et al. |
| 2011/0154087 A1 | 6/2011 | Craine |
| 2012/0098485 A1 | 4/2012 | Kang et al. |
| 2013/0058380 A1 | 3/2013 | Kim et al. |
| 2013/0119778 A1 | 5/2013 | Jung |
| 2013/0154387 A1 | 6/2013 | Lee et al. |

FOREIGN PATENT DOCUMENTS

| | | |
|---|---|---|
| KR | 10-2012-0077447 A | 7/2012 |
| KR | 10-2013-0037190 A | 4/2013 |

OTHER PUBLICATIONS

Supplementary European Search Report issued on Jan. 20, 2017 in counterpart European Patent Application No. 14825663.9 (7 pages, in English).

* cited by examiner

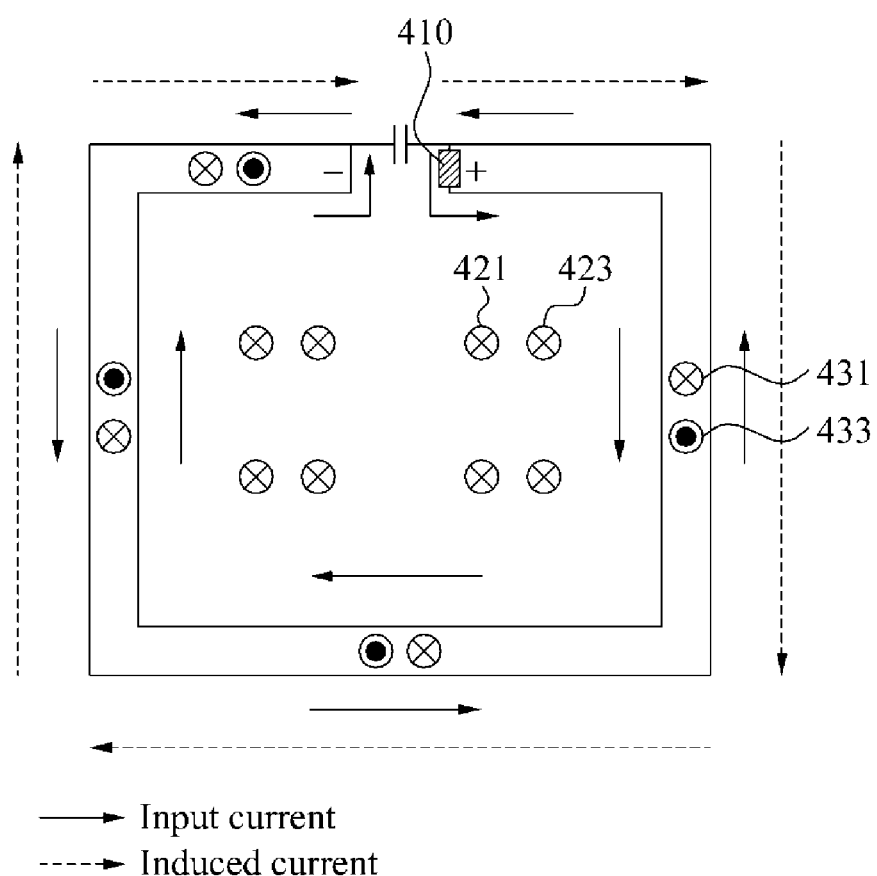

METHOD AND APPARATUS FOR NETWORK COMMUNICATION IN WIRELESS POWER TRANSMISSION SYSTEM

CROSS-REFERENCE TO RELATED APPLICATIONS

This application claims the benefit under 35 USC 119(a) of Korean Patent Application No. 10-2013-0084108 filed on Jul. 17, 2013, in the Korean Intellectual Property Office, the entire disclosure of which is incorporated herein by reference for all purposes.

BACKGROUND

1. Field

The following description relates to a method and apparatus for network communication in a wireless power transmission system.

2. Description of Related Art

Wireless power transmission refers to energy transmitted to a power receiving unit (PRU) from a power transmitting unit (PTU) via magnetic resonant coupling. Accordingly, a wireless power transmission system or a wireless power charging system may include a source for wirelessly transmitting power and a target device for wirelessly receiving power. The source device may be referred to as a source or the PTU. Also, the target device may be referred to as a target or the PRU.

The source device may be provided with a source resonator, and the target device may be provided with a target resonator. The source resonator and the target resonator may cause magnetic resonant coupling.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of configuring a network of a power transmitting unit (PTU) includes determining whether a neighboring PTU is operating in a master mode; determining an operation mode of a PTU based on a result of the determining; and setting a network between the PTU and the neighboring PTU based on the operation mode of the PTU.

The determining of whether the neighboring PTU is operating in the master mode may include transmitting a search signal to the neighboring PTU; and determining that the neighboring PTU is operating in the master mode in response to receiving a response signal responding to the search signal from the neighboring PTU.

The determining of whether the neighboring PTU is operating in the master mode may include determining whether a search signal is received from the neighboring PTU; and determining that the neighboring PTU is not operating in the master mode in response to not receiving the search signal from the neighboring PTU.

The determining of the operation mode of the PTU based on the result of the determining may include setting an operation mode of the PTU to a slave mode in response to a result of the determining being that the neighboring PTU is operating in the master mode; and setting an operation mode of the PTU to a master mode in response to a result of the determining being that the neighboring PTU is not operating in the master mode.

A result of the determining of whether the neighboring PTU is operating in the master mode may be that the neighboring PTU is operating in a slave mode; and the setting of the network between the PTU and the neighboring PTU based on the operation mode of the PTU may include transmitting a connection request signal to the neighboring PTU operating in the slave mode when in response to the operation mode of the PTU being a master mode; and network-connecting the PTU to the neighboring PTU operating in the slave mode when in response to receiving a response signal responding to the connection request signal from the neighboring PTU operating in the slave mode.

A result of the determining of whether the neighboring PTU is operating in the master mode may be that the neighboring PTU is operating in the master mode; and the setting of the network between the PTU and the neighboring PTU based on the operation mode of the PTU may include receiving a connection request signal from the neighboring PTU operating in the master mode in response to the operation mode of the PTU being a slave mode; and transmitting a response signal responding to the connection request signal to the neighboring PTU operating in the master mode.

The method may further including setting an index for either one or both of the PTU and the neighboring PTU.

A result of the determining of whether the neighboring PTU is operating in the master mode may be that the neighboring PTU is operating in the master mode; and the setting of the index for the either one or both of the PTU and the neighboring PTU may include receiving information on an index from the neighboring PTU operating in the master mode in response to the operation mode of the PTU being a slave mode; and setting the index of the PTU based on the information on the index.

A result of the determining of whether the neighboring PTU is operating in the master mode may be that the neighboring PTU is operating in a slave mode; and the setting of the index for the either one or both of the PTU and the neighboring PTU may include transmitting information on an index to the neighboring PTU operating in the slave mode in response to an operation mode of the PTU being a master mode.

The neighboring PTU may be one of a plurality of neighboring PTUs that are network-connected to the PTU; and the transmitting of the information on the index to the neighboring PTU operating in the slave mode may include generating the information on the index based on a sequential order in which the plurality of neighboring PTUs were network-connected to the PTU.

A result of the determining of whether the neighboring PTU is operating in the master mode may be that the neighboring PTU is operating in the master mode; there also may be a neighboring node operating in a slave mode; and the method further may include comparing an index of the PTU to an index of the neighboring PTU operating in the slave mode in response to the neighboring PTU operating in the master mode being is removed; and setting the operation mode of the PTU to the master mode in response to the index of the PTU being higher than the index of the neighboring PTU operating in the slave mode.

The method may further include searching for a host in response to an operation mode of the PTU being a master mode; and network-connecting the PTU to a host found in the searching.

The network-connecting of the PTU to the host found in the searching may include network-connecting the PTU to the neighboring PTU operating in the master mode by setting the operation mode of the PTU to a slave mode when the neighboring PTU operating in the master mode that is network-connected to the host is present.

In another general aspect, a method of configuring a network of a power transmitting unit (PTU) includes searching for a host operating in a master mode; and network-connecting a PTU to a host operating in the master mode found in the searching by setting an operation mode of the PTU to a slave mode.

The method may further include searching for a neighboring PTU operating in the master mode; and setting the PTU to operate as a relay between the host and a neighboring PTU operating in the master mode found in the searching to enable the neighboring PTU operating in the master mode found in the searching to operate in the slave mode with respect to the host.

In another general aspect, a method of configuring a network of a power transmitting unit (PTU) includes searching for a neighboring PTU operating in a slave mode; receiving a received signal strength indicator (RSSI) from a neighboring PTU operating in the slave mode found in the searching; and determining whether the neighboring PTU operating in the slave mode found in the searching is approved to be network-connected to a PTU based on a result of comparing the RSSI to a predetermined reference value.

The determining of whether the neighboring PTU operating in the slave mode found in the searching is approved to be network-connected to the PTU may include approving a network-connection between the PTU and the neighboring PTU operating in the slave mode found in the searching in response to the RSSI being greater than the predetermined reference value; and disapproving a network-connection between the PTU and the neighboring PTU operating in the slave mode found in the searching in response to the RSSI being less than the predetermined reference value.

In another general aspect, a method of configuring a network of a power transmitting unit (PTU) includes receiving wake-up power from a neighboring PTU; and network-connecting a PTU to the neighboring PTU by setting an operation mode of the PTU to a slave mode in response to the received wake-up power satisfying a predetermined condition.

The predetermined condition may include either one or both of a predetermined size of the received wake-up power and a predetermined period of the received wake-up power.

The method may further include transmitting information on a change of wake-up power to the neighboring PTU; and the network-connecting of the PTU to the neighboring PTU by setting the operation mode of the PTU to the slave mode may include network-connecting the PTU to the neighboring PTU by setting the operation mode of the PTU to the slave mode in response to receiving, from the neighboring PTU, wake-up power corresponding to the information on the change of the wake-up power.

The information on the change of the wake-up power may include either one or both of information on a period of the wake-up power and information on a size of the wake-up power.

The neighboring PTU may include a resonator, and may be configured to adjust power supplied to the resonator to generate wake-up power corresponding to the information on the change of the wake-up power.

The method may further include recognizing the neighboring PTU as operating in a master mode in response to the received wake-up power satisfying the predetermined condition.

In another general aspect, a method of configuring a network of a power transmitting unit (PTU) includes detecting an operation mode of a neighboring PTU; setting an operation mode of a PTU based on the operation mode of the neighboring PTU; and setting a network between the PTU and the neighboring PTU based on the operation mode of the PTU.

The setting of the operation mode of the PTU may include setting the operation mode of the PTU to a slave mode in response to the operation mode of the neighboring PTU being a master mode, and setting the operation mode of the PTU to the master mode in response to the operation mode of the neighboring PTU being the slave mode; and the setting of the network may include setting the network in response to a connection request signal received from the neighboring node operating in the master mode, or in response to a response signal received from the neighboring node operating in the slave mode responding to a connection request signal transmitted to the neighboring node operating in the slave mode.

The detecting of the operation mode of the neighboring node may include detecting the operation mode of the neighboring node based on whether a search signal is received from the neighboring node.

The setting of the network may include determining whether to set the network based on whether a received signal strength indicator (RSSI) received from the neighboring node is greater than a predetermined reference value, or whether wake-up power received from the neighboring node satisfies a predetermined reference value.

Other features and aspects will be apparent from the following detailed description, the drawings, and the claims.

BRIEF DESCRIPTION OF THE DRAWINGS

FIG. 4A illustrates an example of a distribution of a magnetic field inside a resonator produced by feeding a feeder.

DETAILED DESCRIPTION

Figure 1:
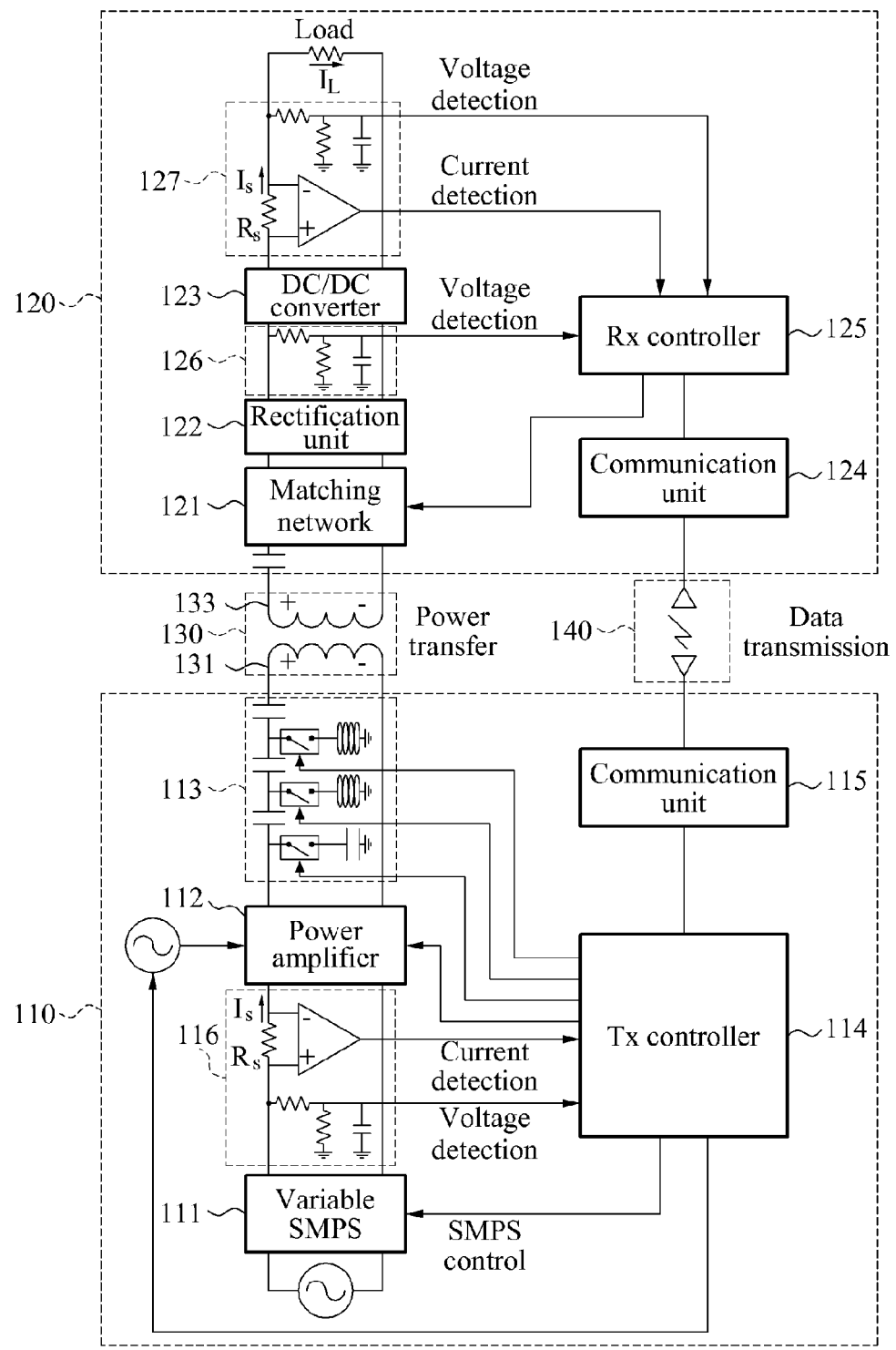
FIG. 1 illustrates an example of a wireless power transmission system.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, description of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

Schemes of performing communication between a source and a target or between a source and another source may include an in-band communication scheme and an out-of-band communication scheme.

In the in-band communication scheme, a source and a target, or a source and another source, communicate with each other using a frequency that is the same as a frequency used for power transmission.

In the out-of-band communication scheme, a source and a target, or a source and another source, communicate with each other using a frequency that is different from a frequency used for power transmission.

FIG. 1 illustrates an example of a wireless power transmission system.

Referring to FIG. 1, the wireless power transmission system includes a source 110 and a target 120. The source 110 is a device configured to supply wireless power, and may be any electronic device capable of supplying power, for example, a pad, a terminal, a tablet personal computer (PC), a television (TV), a medical device, or an electric vehicle. The target 120 is a device configured to receive wireless power, and may be any electronic device requiring power to operate, for example, a pad, a terminal, a tablet PC, a medical device, an electric vehicle, a washing machine, a radio, or a lighting system.

The source 110 includes a variable switching mode power supply (SMPS) 111, a power amplifier (PA) 112, a matching network 113, a transmission (Tx) controller 114 (for example, Tx control logic), a communicator 115, and a power detector 116.

The variable SMPS 111 generates a direct current (DC) voltage by switching an alternating current (AC) voltage having a frequency in a band of tens of hertz (Hz) output from a power supply. The variable SMPS 111 may output a fixed DC voltage, or may output an adjustable DC voltage that may be adjusted under control of the Tx controller 114.

The variable SMPS 111 may control its output voltage supplied to the PA 112 based on a level of power output from the PA 112 so that the PA 112 may operate in a saturation region with a high efficiency at all times, thereby enabling a maximum efficiency to be maintained at all levels of the output power of the PA 112. The PA 112 may be, for example, a Class-E amplifier.

If a fixed SMPS is used instead of the variable SMPS 111, a variable DC-to-DC (DC/DC) converter may be necessary. In this example, the fixed SMPS outputs a fixed DC voltage to the variable DC/DC converter, and the variable DC/DC converter controls its output voltage supplied to the PA 112 based on the level of the power output from the PA 112 so that the PA 112, which may be a Class-E amplifier, may operate in the saturation region with a high efficiency at all times, thereby enabling the maximum efficiency to be maintained at all levels of the output power.

The power detector 116 detects an output current and an output voltage of the variable SMPS 111, and transmits, to the Tx controller 114, information on the detected output current and the detected output voltage. Also, the power detector 116 may detect an input current and an input voltage of the PA 112.

The PA 112 generates power by converting a DC voltage having a predetermined level supplied to the PA 112 by the variable SMPS 111 to an AC voltage using a switching pulse signal having a frequency in a band of a few megahertz (MHz) to tens of MHz. For example, the PA 112 may convert the DC voltage supplied to the source 110 to an AC voltage having a reference resonant frequency $F_{Ref}$, and may generate communication power used for communication, and/or a charging power used for charging. The communication power and the charging power may be used in a plurality of targets.

If a high power from a few kilowatts (kW) to tens of kW is transmitted using a resonant frequency in a band of tens of kilohertz (kHz) to hundreds of kHz, the PA 112 may be omitted, and power may be supplied to a source resonator 131 from the variable SMPS 111 or a high-power source. For example, an inverter may be used in lieu of the PA 112. The inverter may convert a DC power supplied from the high-power source to an AC power. In particular, the inverter may convert the power by converting a DC voltage having a predetermined level to an AC voltage using a switching pulse signal having a frequency in a band of tens of kHz to hundreds of kHz. For example, the inverter may convert the DC voltage having the predetermined level to an AC voltage having a resonant frequency of the source resonator 131 in a band of tens of kHz to hundreds of kHz.

As used herein, the term "communication power" refers to a low power of 0.1 milliwatts (mW) to 1 mW. The term "charging power" refers to a high power of a few mW to tens of kW consumed by a device load of a target. As used herein, the term "charging" refers to supplying power to a unit or element configured to charge a battery or other rechargeable device. Additionally, the term "charging" refers to supplying power to a unit or element configured to consume power. For example, the term "charging power" may refer to power consumed by a target while operating, or power used to charge a battery of the target. The unit or element may be, for example, a battery, a display device, a sound output circuit, a main processor, or any of various types of sensors.

As used herein, the term "reference resonant frequency" refers to a resonant frequency nominally used by the source 110, and the term "tracking frequency" refers to a resonant frequency used by the source 110 that has been adjusted based on a preset scheme.

The Tx controller 114 may detect a reflected wave of the communication power or the charging power, and may detect mismatching that may occur between a target resonator 133 and the source resonator 131 based on the detected reflected wave. To detect the mismatching, for example, the Tx controller 114 may detect an envelope of the reflected wave, a power amount of the reflected wave, or any other characteristic of the reflected wave that is affected by mismatching.

The matching network 113 compensates for impedance mismatching between the source resonator 131 and the target resonator 133 to achieve optimal under the control of the Tx controller 114. The matching network 113 includes at least one inductor and at least one capacitor each connected to a respective switch controlled by the Tx controller 114.

If a high power is to be transmitted using a resonant frequency in a band of tens of kHz to hundreds of kHz, the matching network 113 may be omitted from the source 110 because the effect of the matching network 113 may be reduced when transmitting a high power.

The Tx controller 114 may calculate a voltage standing wave ratio (VSWR) based on a level of an output voltage of the source resonator 131 or the PA 112 and a voltage level of the reflected wave. In one example, if the VSWR is greater than a predetermined value, the Tx controller 114 may determine that a mismatch is detected between the source resonator 131 and the target resonator 133.

In another example, if the Tx controller 114 detects that the VSWR is greater than the predetermined value, the Tx controller 114 may calculate a wireless power transmission efficiency for each of N tracking frequencies, determine a tracking frequency $F_{Best}$ providing the best wireless power transmission efficiency among the N tracking frequencies, and adjust the reference resonant frequency $F_{Ref}$ to the tracking frequency $F_{Best}$. The N tracking frequencies may be set in advance.

The Tx controller 114 may adjust a frequency of the switching pulse signal used by the PA 112. The frequency of the switching pulse signal may be determined under the control of the Tx controller 114. The Tx controller 114 may generate a modulated signal to be transmitted to the target 120 by controlling the PA 112. The communicator 115 may transmit various forms of data to the target 120 using in-band communication. The Tx controller 114 may also detect a reflected wave, and may demodulate a signal received from the target 120 from an envelope of the detected reflected wave.

The Tx controller 114 may generate a modulated signal for in-band communication using various techniques. For example, the Tx controller 114 may generate a modulated signal by turning the switching pulse signal used by the PA 112 on and off, by performing delta-sigma modulation, or by any other modulation technique known to one of ordinary skill in the art. Additionally, the Tx controller 114 may generate a pulse-width modulated (PWM) signal having a predetermined envelope.

The Tx controller 114 may determine an initial wireless power to be transmitted to the target 120 based on a change in a temperature of the source 110, a battery state of the target 120, a change in an amount of power received by the target 120, and/or a change in a temperature of the target 120.

The source 110 may further include a temperature measurement sensor (not illustrated) configured to detect a change in a temperature of the source 110. The source 110 may receive from the target 120 information regarding the battery state of the target 120, the change in the amount of power received by the target 120, and/or the change in the temperature of the target 120 by communicating with the target 120. In particular, the source 110 may detect the change in the temperature of the target 120 based on the information received from the target 120.

The Tx controller 114 may adjust a voltage supplied to the PA 112 based on the change in the temperature of the target 120 using a lookup table (LUT). The LUT may store a level of the voltage to be supplied to the PA 112 based on the change in the temperature of the source 110. For example, when the temperature of the source 110 rises, the Tx controller 114 may reduce the voltage to be supplied to the PA 112 by controlling the variable SMPS 111.

The communicator 115 may perform out-of-band communication using a separate communication channel. The communicator 115 may include a communication module, such as a ZigBee module, a Bluetooth module, or any other communication module known to one of ordinary skill in the art, that the communicator 115 may use to transmit or receive data 140 to or from the target 120 via the out-of-band communication.

The source resonator 131 transmits electromagnetic energy 130 to the target resonator 133. For example, the source resonator 131 may transmit the communication power or the charging power to the target 120 via a magnetic coupling with the target resonator 133.

The source resonator 131 may be made of a superconducting material. Also, although not shown in FIG. 1, the source resonator 131 may be disposed in a container of coolant to enable the source resonator 131 to maintain a superconducting state. A heated coolant that has transitioned to a gaseous state may be liquefied to a liquid state by a cooler. The target resonator 133 may also be made of superconducting material. In this instance, the target resonator 133 may also be disposed in a container of coolant to enable the target resonator 133 to maintain a superconducting state.

The target 120 includes a matching network 121, a rectifier 122, a DC/DC converter 123, a communicator 124, and a reception (Rx) controller 125 (for example, RC control logic), a voltage detector 126, and a power detector 127.

The target resonator 133 receives the electromagnetic energy 130 from the source resonator 131. For example, the target resonator 133 may receive the communication power or the charging power from the source 110 via a magnetic coupling with the source resonator 131. Additionally, the target resonator 133 may receive data from the source 110 via in-band communication.

The target resonator 133 may receive the initial wireless power determined by the Tx controller 114 based on the change in the temperature of the source 110, the battery state of the target 120, the change in the amount of power received by the target 120, and/or the change in the temperature of the target 120.

The matching network 121 matches an input impedance viewed from the source 110 to an output impedance viewed from a load of the target 120. The matching network 121 may be configured to have at least one capacitor and at least one inductor.

The rectifier 122 generates a DC voltage by rectifying an AC voltage received from the target resonator 133.

The DC/DC converter 123 adjusts a level of the DC voltage output from the rectifier 122 based on a voltage required by the load. As an example, the DC/DC converter 123 may adjust the level of the DC voltage output from the rectifier 122 to a level in a range from 3 volts (V) to 10 V.

The voltage detector 126 detects a voltage of an input terminal of the DC/DC converter 123, and the power detector 127 detects a current and a voltage of an output terminal of the DC/DC converter 123. The detected voltage of the input terminal may be used to calculate a wireless power transmission efficiency of the power received from the source 110. The detected current and the detected voltage of the output terminal may be used by the Rx controller 125 to calculate an amount of power actually transferred to the load. The Tx controller 114 of the source 110 may calculate an amount of power that needs to be transmitted by the source 110 to the target 120 based on an amount of power required by the load and the amount of power actually transferred to the load.

If the amount of the power actually transferred to the load calculated by the RC controller 125 is transmitted to the source 110 by the communicator 124, the source 110 may calculate the amount of power that needs to be transmitted to the target 120.

The Rx controller 125 may perform in-band communication to transmit or receive data using a resonant frequency. During the in-band communication, the Rx controller 125 may demodulate a received signal by detecting a signal between the target resonator 133 and the rectifier 122, or detecting an output signal of the rectifier 122. In particular, the Rx controller 125 may demodulate a message received via the in-band communication.

Additionally, the Rx controller 125 may adjust an input impedance of the target resonator 133 using the matching network 121 to modulate a signal to be transmitted to the source 110. For example, the Rx controller 125 may adjust the matching unit to increase the input impedance of the target resonator 133 so that a reflected wave will be detected by the TX controller 114 of the source 110. Depending on whether the reflected wave is detected, the Tx controller 114 of the source 110 may detect a first value, for example, a binary number "0," or a second value, for example, a binary number "1." For example, when the reflected wave is detected, the Tx controller 114 may detect "0", and when the reflected wave is not detected, the Tx controller 114 may detect "1". Alternatively, when the reflected wave is detected, the Tx controller 114 may detect "1", and when the reflected wave is not detected, the Tx controller 114 may detect "0".

The communicator 124 of the target 120 may transmit a response message to the communicator 115 of the source 110. For example, the response message may include any one or any combination of a product type of the target 120, manufacturer information of the target 120, a product model name of the target 120, a battery type of the target 120, a charging scheme of the target 120, an impedance value of a load of the target 120, information on characteristics of the target resonator 133 of the target 120, information on a frequency band used by the target 120, an amount of power consumed by the target 120, an identifier (ID) of the target 120, product version information of the target 120, standard information of the target 120, and any other information about the target 120.

The communicator 124 may perform out-of-band communication using a separate communication channel. For example, the communicator 124 may include a communication module, such as a ZigBee module, a Bluetooth module, or any other communication module known to one of ordinary skill in the art that the communicator 124 may use to transmit and receive the data 140 to and from the source 110 via the out-of-band communication.

The communicator 124 may receive a wake-up request message from the source 110, and the power detector 127 may detect an amount of power received by the target resonator 133. The communicator 124 may transmit to the source 110 information on the detected amount of the power received by the target resonator 133. The information on the detected amount of the power received by the target resonator 133 may include, for example, an input voltage value and an input current value of the rectifier 122, an output voltage value and an output current value of the rectifier 122, an output voltage value and an output current value of the DC/DC converter 123, and any other information on the detected amount of the power received by the target resonator 133.

In the following description of FIGS. 2A through 4B, unless otherwise indicated, the term "resonator" may refer to both a source resonator and a target resonator. The resonator in FIGS. 2A through 4B may be used as the resonators described with respect to FIG. 1 and FIG. 5 through FIG. 13.

Figure 2A:
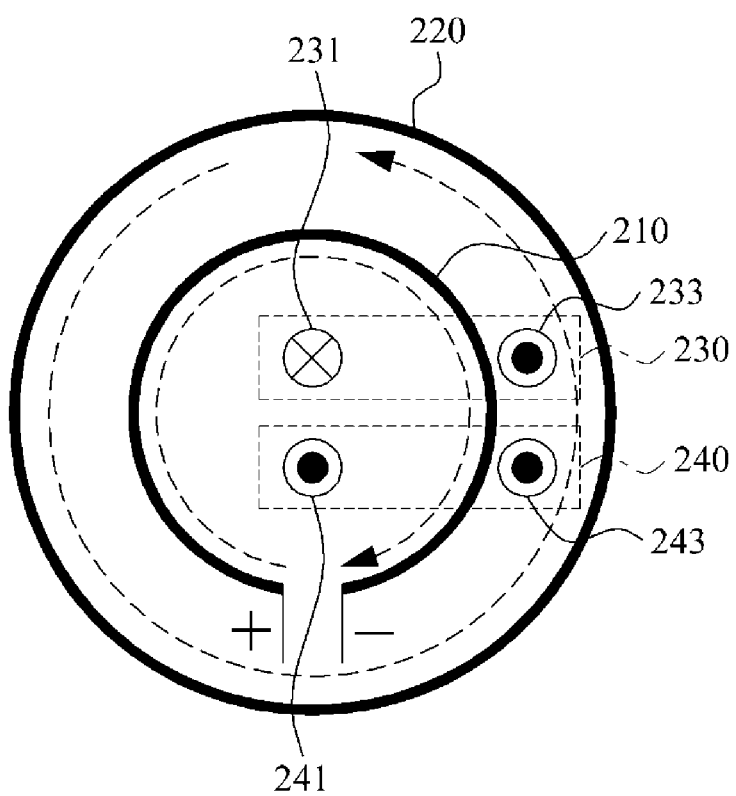
FIGS. 2A and 2B illustrate examples of a distribution of a magnetic field in a resonator and a feeder.
Figure 2B:
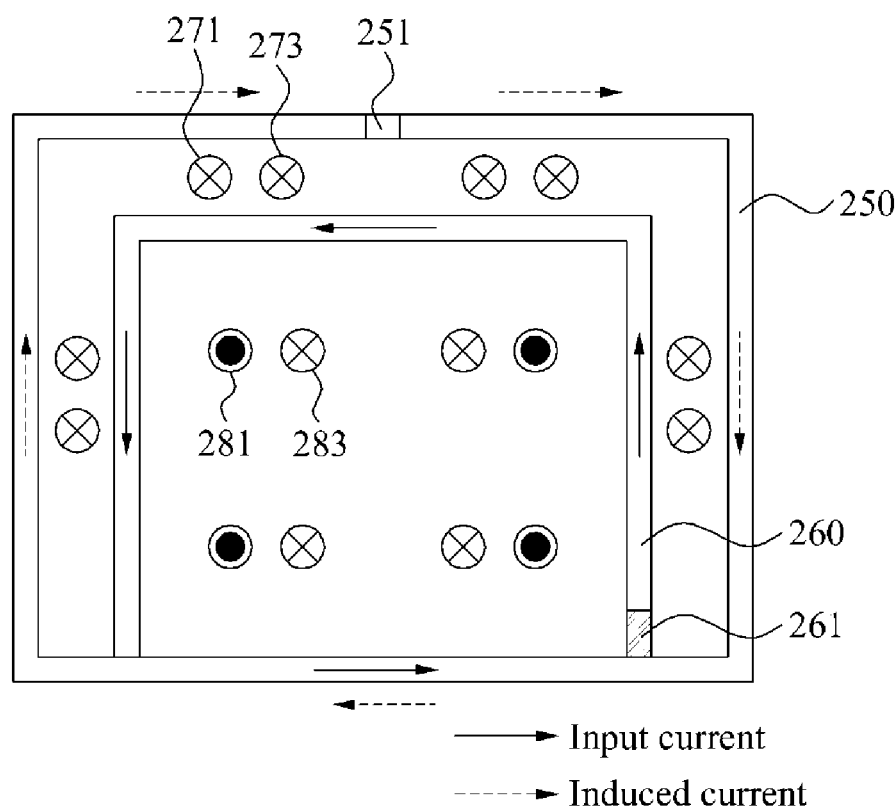

FIGS. 2A and 2B illustrate examples of a distribution of a magnetic field in a feeder and a resonator. When power is supplied to a resonator through a separate feeder, a magnetic field is generated in both the feeder and the resonator. A source resonator and a target resonator may each include a double loop structure configured by an external loop and an internal loop.

FIG. 2A is a diagram illustrating an example of a structure of a wireless power transmitter in which a feeder 210 and a resonator 220 do not have a common ground. Referring to FIG. 2A, when an input current flows into the feeder 210 through a terminal labeled "+" and out of the feeder 210 through a terminal labeled "−", a magnetic field 230 is generated by the input current. A direction 231 of the magnetic field 230 inside the feeder 210 is into the plane of FIG. 2A, and is opposite to a direction 233 of the magnetic field 230 outside the feeder 210, which is out of the plane of FIG. 2A. The magnetic field 230 generated by the feeder 210 induces a current to flow in the resonator 220. A direction of the induced current in the resonator 220 is opposite to a direction of the input current in the feeder 210 as indicated by the lines with arrowheads in FIG. 2A.

The induced current in the resonator 220 generates a magnetic field 240. Directions of the magnetic field 240 generated by the resonator 220 are the same at all positions inside the resonator 220, and are out of the plane of FIG. 2A. Accordingly, a direction 241 of the magnetic field 240 generated by the resonator 220 inside the feeder 210 is the same as a direction 243 of the magnetic field 240 generated by the resonator 220 outside the feeder 210.

Consequently, when the magnetic field 230 generated by the feeder 210 and the magnetic field 240 generated by the resonator 220 are combined, a strength of the total magnetic field decreases inside the feeder 210, but increases outside the feeder 210. Accordingly, when power is supplied to the resonator 220 via the feeder 210 in a structure of FIG. 2A, the strength of the total magnetic field decreases in the portion of the resonator 220 inside the feeder 210, but increases in the portion of the resonator 220 outside the feeder 210. When a distribution of the magnetic field in the resonator 220 is not uniform, performing impedance matching may be difficult because an input impedance frequently varies. Also, an average wireless power transmission efficiency may decrease because performance of wireless power transmission may be excellent in a portion of the resonator 220 where the magnetic field is strong, and poor in a portion of the resonator 220 where the magnetic field is weak.

FIG. 2B illustrates an example of a structure of a wireless power transmitter in which a resonator 250 and a feeder 260 have a common ground. The resonator 250 includes a capacitor 251. The feeder 260 receives a radio frequency (RF) signal via a port 261. When the RF signal is input to the feeder 260, an input current is generated in the feeder 260. The input current flowing in the feeder 260 generates a magnetic field, and a current is induced in the resonator 250 by the magnetic field. Also, another magnetic field is generated by the induced current flowing in the resonator 250. In this instance, a direction of the input current flowing in the feeder 260 is opposite to a direction of the induced current flowing in the resonator 250. Accordingly, the strength of the total magnetic field increase in a region between the resonator 250 and the feeder 260 because a direction 271 of the magnetic field generated by the input current is the same as a direction 273 of the magnetic field generated by the induced current in the region between the resonator 250 and the feeder 260. Conversely, the strength of the total magnetic field decreases inside the feeder 260 because a direction 281 of the magnetic field generated by the input current is opposite to a direction 283 of the magnetic field generated by the induced current. Therefore, the strength of the total magnetic field decreases in a portion of the resonator 250 inside the feeder 260, but increases in a portion of the resonator 250 outside the feeder 260.

An input impedance may be adjusted by adjusting an internal area of the feeder 260. The input impedance refers to an impedance viewed from the feeder 260 to the resonator 250. When the internal area of the feeder 260 increases, the input impedance increases, and when the internal area of the feeder 260 decreases, the input impedance decreases. However, if the magnetic field is randomly or not uniformly distributed in the resonator 250, the input impedance may vary based on a position of a target even if the internal area of the feeder 260 has been adjusted to adjust the input impedance to match an output impedance of a power amplifier for a specific location of the target device. Accordingly, a separate matching network may be needed to match the input impedance to the output impedance of the power amplifier. For example, when the input impedance increases, a separate matching network may be needed to match the increased input impedance to a relatively low output impedance of the power amplifier.

Figure 3A:
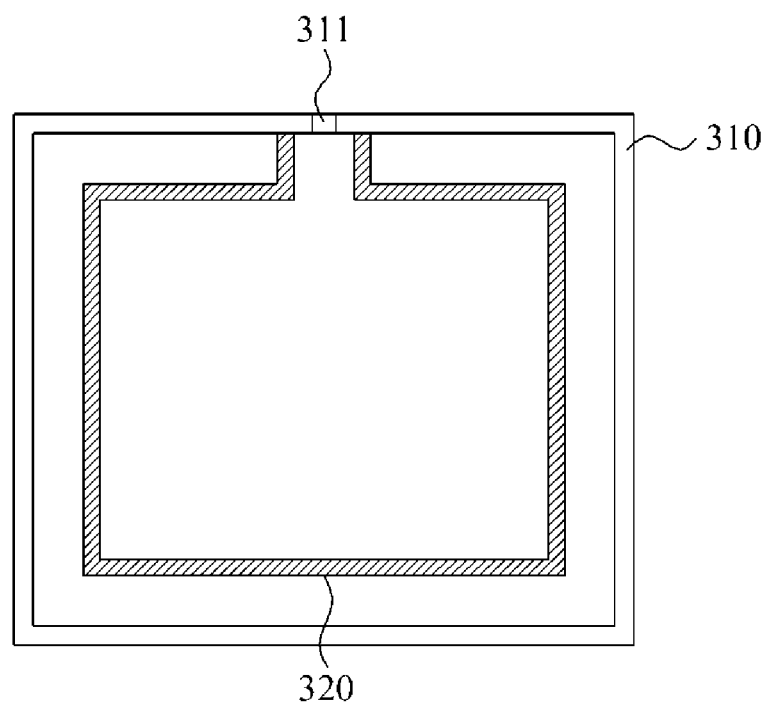
FIGS. 3A and 3B illustrate an example of a configuration of a resonator and a feeder.
Figure 3B:
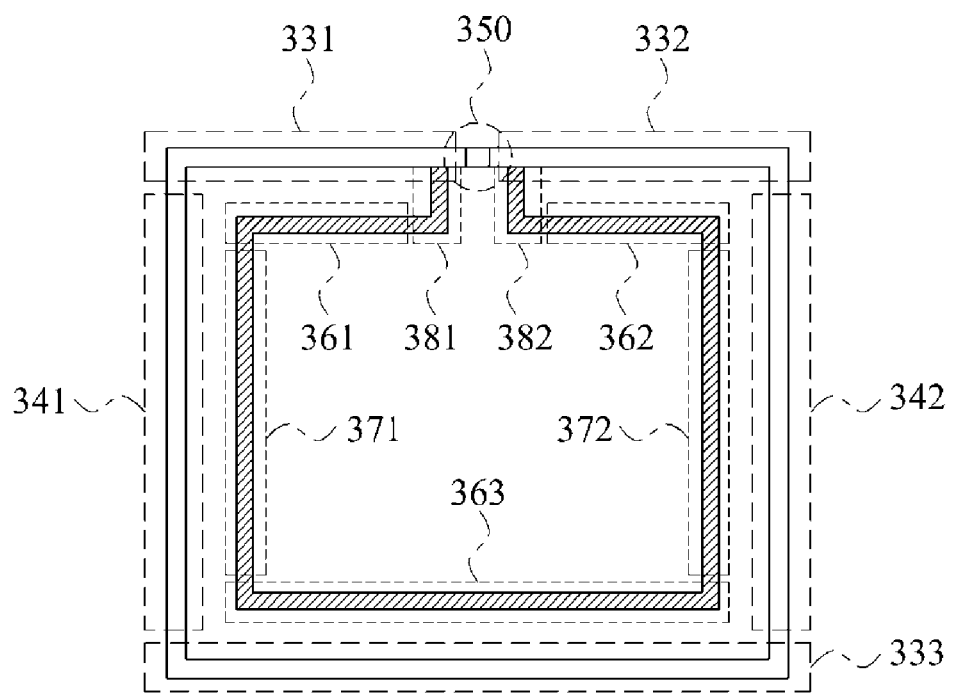

FIGS. 3A and 3B illustrate an example of a configuration of a resonator and a feeder.

Referring to FIG. 3A, a resonator 310 includes a capacitor 311. A feeder 320 is electrically connected to both ends of the capacitor 311.

FIG. 3B illustrates in greater detail a structure of FIG. 3A in more detail. The resonator 310 includes a first transmission line (not identified by a reference numeral in FIG. 3B, but formed by various elements in FIG. 3B as discussed below), a first conductor 341, a second conductor 342, and at least one capacitor 350.

The capacitor 350 is inserted in series between a first signal conducting portion 331 and a second signal conducting portion 332, causing an electric field to be concentrated in the capacitor 350. In general, a transmission line includes at least one conductor disposed in an upper portion of the transmission line, and at least one conductor disposed in a lower portion of the transmission line. A current may flow through the at least one conductor disposed in the upper portion of the transmission line, and the at least one conductor disposed in the lower portion of the transmission line may be electrically grounded. In this example, a conductor disposed in the upper portion of the first transmission line in FIG. 3B is separated into two portions that will be referred to as the first signal conducting portion 331 and the second signal conducting portion 332, and a conductor disposed in the lower portion of the first transmission line in FIG. 3B will be referred to as a first ground conducting portion 333.

As shown in FIG. 3B, the resonator has a generally two-dimensional (2D) structure. The first transmission line includes the first signal conducting portion 331 and the second signal conducting portion 332 in the upper portion of the first transmission line, and the first ground conducting portion 333 in the lower portion of the first transmission line. The first signal conducting portion 331 and the second signal conducting portion 332 are disposed to face the first ground conducting portion 333. A current flows through the first signal conducting portion 331 and the second signal conducting portion 332.

Also, as shown in FIG. 3B, one end of the first signal conducting portion 331 is connected to the first conductor 341, the other end of the first signal conducting portion 331 is connected to one end of the capacitor 350, and the other end of the first conductor 341 is connected to one end of the first ground conducting portion 333. One end of the second signal conducting portion 332 is connected to one end of the second conductor 342, the other end of the second signal conducting portion 332 is connected to the other end of the capacitor 350, and the other end of the second conductor 342 is connected to the other end of the first ground conducting portion 333. Accordingly, the first signal conducting portion 331, the second signal conducting portion 332, the first ground conducting portion 333, and the first conductor 341, and the second conductor 342 are connected to one another, causing the resonator 310 to have an electrically closed loop structure. The "loop structure" includes a polygonal structure, a circular structure, a rectangular structure, and any other geometrical structure that is closed, i.e., a geometrical structure that does not have any opening in its perimeter. The expression "having a loop structure" indicates a structure that is electrically closed.

The capacitor 350 is inserted into an intermediate portion of the first transmission line. In the example in FIG. 3B, the capacitor 350 is inserted between the first signal conducting portion 331 and the second signal conducting portion 332. The capacitor 350 may be a lumped element capacitor, a distributed element capacitor, or any other type of capacitor known to one of ordinary skill in the art. For example, a distributed element capacitor may include zigzagged conductor lines and a dielectric material having a high permittivity disposed between the zigzagged conductor lines.

The capacitor 350 inserted into the first transmission line may cause the resonator 310 to have a characteristic of a metamaterial. A metamaterial is a material having an electrical characteristic that is not found in nature, and thus may have an artificially designed structure. All materials existing in nature have a permittivity and a magnetic permeability, and most materials have a positive permittivity and/or a positive magnetic permeability.

A right-hand rule may be applied to an electric field, a magnetic field, and a Poynting vector in most materials, so the corresponding materials may be referred to as right-handed materials (RHMs). However, a metamaterial that has permittivity and/or a magnetic permeability that is not found in nature may be classified into an epsilon negative (ENG) material, a mu negative (MNG) material, a double negative (DNG) material, a negative refractive index (NRI) material, a left-handed (LH) material, and any other metamaterial classification known to one of ordinary skill in the art based on a sign of the permittivity of the metamaterial and a sign of the magnetic permeability of the metamaterial.

If the capacitor 350 is a lumped element capacitor and a capacitance of the capacitor 350 is appropriately determined, the resonator 310 may have a characteristic of a metamaterial. If the resonator is caused to have a negative magnetic permeability by appropriately adjusting the capacitance of the capacitor 350, the resonator 310 may also be referred to as an MNG resonator. Various criteria may be applied to determine the capacitance of the capacitor 350. For example, the various criteria may include a criterion for enabling the resonator 310 to have the characteristic of the metamaterial, a criterion for enabling the resonator 310 to have a negative magnetic permeability at a target frequency, a criterion for enabling the resonator 310 to have a zeroth-order resonance characteristic at the target frequency, and any other suitable criterion. Based on any one or any combination of the aforementioned criteria, the capacitance of the capacitor 350 may be appropriately determined.

The resonator 310, hereinafter referred to as the MNG resonator, may have a zeroth-order resonance characteristic of having a resonant frequency when a propagation constant is "0". When the MNG resonator has the zeroth-order characteristic, the resonant frequency is independent of a physical size of the MNG resonator. The resonant frequency of the MNG resonator may be changed without changing the physical size of the MNG resonator by changing the capacitance of the capacitor 350.

In a near field, the electric field is concentrated in the capacitor 350 inserted into the first transmission line, causing the magnetic field to become dominant in the near field. The MNG resonator has a relatively high Q-factor when the capacitor 350 is a lumped element capacitor, thereby increasing a wireless power transmission efficiency. The Q-factor indicates a level of an ohmic loss or a ratio of a reactance with respect to a resistance in the wireless power transmission. As will be understood by one of ordinary skill in the art, the wireless power transmission efficiency will increase as the Q-factor increases.

Although not illustrated in FIG. 3B, a magnetic core passing through the MNG resonator may be provided to increase a wireless power transmission distance.

Referring to FIG. 3B, the feeder 320 includes a second transmission line (not identified by a reference numeral in FIG. 3B, but formed by various elements in FIG. 3B as discussed below), a third conductor 371, a fourth conductor 372, a fifth conductor 381, and a sixth conductor 382.

The second transmission line includes a third signal conducting portion 361 and a fourth signal conducting portion 362 in an upper portion of the second transmission includes a second ground conducting portion 363 in a lower portion of the second transmission line. The third signal conducting portion 361 and the fourth signal conducting portion 362 are disposed to face the second ground conducting portion 363. A current flows through the third signal conducting portion 361 and the fourth signal conducting portion 362.

Additionally, as shown in FIG. 3B, one end of the third signal conducting portion 361 is connected to one end of the third conductor 371, the other end of the third signal conducting portion 361 is connected to one end of the fifth conductor 381, and the other end of the third conductor 371 is connected to one end of the second ground conducting portion 363. One end of the fourth signal conducting portion 362 is connected to one end of the fourth conductor 372, the other end of the fourth signal conducting portion 362 is connected to one end of the sixth conductor 382, and the other end of the fourth conductor 372 is connected to the other end of the second ground conducting portion 363. The other end of the fifth conductor 381 connected to the first signal conducting portion 331 at or near where the first signal conducting portion 331 is connected to one end of the capacitor 350, and the other end of the sixth conductor 382 is connected to the second signal conducting portion 332 at or near where the second signal conducting portion 332 is connected to the other end of the capacitor 350. Thus, the fifth conductor 381 and the sixth conductor 382 are connected in parallel with both ends of the capacitor 350. The fifth conductor 381 and the sixth conductor 382 are used as input ports to receive an RF signal as an input.

Accordingly, the third signal conducting portion 361, the fourth signal conducting portion 362, the second ground conducting portion 363, the third conductor 371, the fourth conductor 372, the fifth conductor 381, the sixth conductor 382, and the resonator 310 are connected to one another, causing the resonator 310 and the feeder 320 to have an electrically closed loop structure. The term "loop structure" includes a polygonal structure, a circular structure, a rectangular structure, and any other geometrical structure that is closed, i.e., a geometrical structure that does not have any opening in its perimeter. The expression "having a loop structure" indicates a structure that is electrically closed.

If an RF signal is input to the fifth conductor 381 or the sixth conductor 382, an input current flows through the feeder 320 and the resonator 310, generating a magnetic field that induces a current in the resonator 310. A direction of the input current flowing through the feeder 320 is the same as a direction of the induced current flowing through the resonator 310, thereby causing a strength of a total magnetic field to increase in the center of the resonator 310, and decrease near the outer periphery of the resonator 310.

An input impedance is determined by an area of a region between the resonator 310 and the feeder 320. Accordingly, a separate matching network used to match the input impedance to an output impedance of a power amplifier may not be required. However, even if a matching network is used, the input impedance may be adjusted by adjusting a size of the feeder 320, and accordingly a structure of the matching network may be simplified. The simplified structure of the matching network reduces a matching loss of the matching network.

The second transmission line, the third conductor 371, the fourth conductor 372, the fifth conductor 381, and the sixth conductor 382 of the feeder 320 may have the same structure as the resonator 310. For example, if the resonator 310 has a loop structure, the feeder 320 may also have a loop structure. As another example, if the resonator 310 has a circular structure, the feeder 320 may also have a circular structure.

FIG. 4A illustrates an example of a distribution of a magnetic field inside a resonator produced by feeding a feeder. FIG. 4A more simply illustrates the resonator 310 and the feeder 320 of FIGS. 3A and 3B, and the names of the various elements in FIG. 3B will be used in the following description of FIG. 4A without reference numerals for ease of description.

A feeding operation may be an operation of supplying power to a source resonator in wireless power transmission, or an operation of supplying an AC power to a rectifier in the wireless power transmission. FIG. 4A illustrates a direction of an input current flowing in the feeder 320, and a direction of an induced current flowing in the source resonator 310. Additionally, FIG. 4A illustrates a direction of a magnetic field generated by the input current of the feeder 320, and a direction of a magnetic field generated by the induced current of the source resonator 310.

Referring to FIG. 4A, the fifth conductor or the sixth conductor of the feeder 320 may be used as an input port 410. In FIG. 4A, the sixth conductor of the feeder 320 is being used as the input port 410. The input port 410 receives an RF signal as an input. The RF signal may be output from a power amplifier. The power amplifier may increase or decrease an amplitude of the RF signal based on a power requirement of a target. The RF signal received by the input port 410 is represented in FIG. 4A as an input current flowing in the feeder 320. The input current flows in a clockwise direction in the feeder 320 along the second transmission line of the feeder 320. The fifth conductor and the sixth conductor of the feeder 320 are electrically connected to the resonator 310. More particularly, the fifth conductor of the feeder 320 is connected to the first signal conducting portion of the resonator 310, and the sixth conductor of the feeder 320 is connected to the second signal conducting portion of the resonator 310. Accordingly, the input current flows in both the resonator 310 and the feeder 320. The input current flows in a counterclockwise direction in the resonator 310 along the first transmission line of the resonator 310. The input current flowing in the resonator 310 generates a magnetic field, and the magnetic field induces a current in the resonator 310. The induced current flows in a clockwise direction in the resonator 310 along the first transmission line of the resonator 310. The induced current in the resonator 310 supplies energy to a capacitor of the resonator 310, and also generates a magnetic field. In this example, the input current flowing in the feeder 320 and the resonator 310 is indicated by solid lines with arrowheads in FIG. 4A, and the induced current flowing in the resonator 310 is indicated by dashed lines with arrowheads in FIG. 4A.

A direction of a magnetic field generated by a current is determined based on the right-hand rule. As illustrated in FIG. 4A, inside the feeder 320, a direction 421 of the magnetic field generated by the input current flowing in the feeder 320 is the same as a direction 423 of a magnetic field generated by the induced current flowing in the resonator 310. Accordingly, a strength of the total magnetic field increases inside the feeder 320.

In contrast, as illustrated in FIG. 4A, in a region between the feeder 320 and the resonator 310, a direction 433 of the magnetic field generated by the input current flowing in the feeder 320 is opposite to a direction 431 of the magnetic field generated by the induced current flowing in the source resonator 310, as illustrated in FIG. 4A. Accordingly, the strength of the total magnetic field decreases in the region between the feeder 320 and the resonator 310.

Typically, in a resonator having a loop structure, a strength of a magnetic field decreases in the center of the resonator, and increases near an outer periphery of the resonator. However, referring to FIG. 4A, since the feeder 320 is electrically connected to both ends of the capacitor of the resonator 310, the direction of the induced current in the resonator 310 is the same as the direction of the input current in the feeder 320. Since the direction of the induced current in the resonator 310 is the same as the direction of the input current in the feeder 320, the strength of the total magnetic field increases inside the feeder 320, and decreases outside the feeder 320. As a result, due to the feeder 320, the strength of the total magnetic field increases in the center of the resonator having the loop structure, and decreases near an outer periphery of the resonator, thereby compensating for the normal characteristic of the resonator having the loop structure in which the strength of the magnetic field decreases in the center of the resonator, and increases near the outer periphery of the resonator. Thus, the strength of the total magnetic field may be constant inside the resonator 310.

A wireless power transmission efficiency of transmitting power from a source resonator to a target resonator is proportional to the strength of the total magnetic field generated in the source resonator. Accordingly, when the strength of the total magnetic field increases in the center of the source resonator, the wireless power transmission efficiency also increases.

Figure 4B:
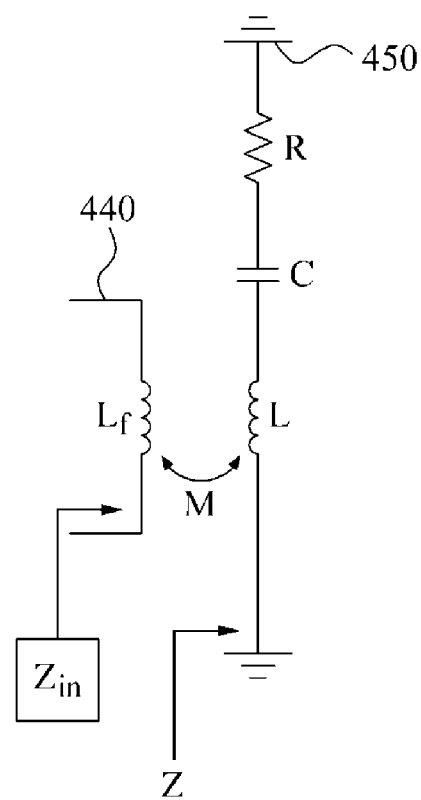
FIG. 4B illustrates an example of equivalent circuits of a feeder and a resonator.

FIG. 4B illustrates an example of equivalent circuits of a feeder and a resonator. Referring to FIG. 4B, a feeder 440 and a resonator 450 may be represented by the equivalent circuits in FIG. 4B. The feeder 440 is represented as an inductor having an inductance $L_f$, and the resonator 450 is represented as a series connection of an inductor having an inductance L coupled to the inductance $L_f$ of the feeder 440 by a mutual inductance M, a capacitor having a capacitance C, and a resistor having a resistance R. An example of an input impedance $Z_{in}$ viewed in a direction from the feeder 440 to the resonator 450 may be expressed by the following Equation 1:

$$Z_{in} = \frac{(\omega M)^2}{Z} \quad (1)$$

In Equation 1, M denotes a mutual inductance between the feeder 440 and the resonator 450, ω denotes a resonant frequency of the feeder 440 and the resonator 450, and Z denotes an impedance viewed in a direction from the resonator 450 to a target. As can be seen from Equation 1, the input impedance $Z_{in}$ is proportional to the square of the mutual inductance M. Accordingly, the input impedance $Z_{in}$ may be adjusted by adjusting the mutual inductance M. The mutual inductance M depends on an area of a region between the feeder 440 and the resonator 450. The area of the region between the feeder 440 and the resonator 450 may be adjusted by adjusting a size of the feeder 440, thereby adjusting the mutual inductance M and the input impedance $Z_{in}$. Since the input impedance $Z_{in}$ may be adjusted by adjusting the size of the feeder 440, it may be unnecessary to use a separate matching network to perform impedance matching with output impedance of a power amplifier.

In a target resonator and a feeder included in a wireless power receiver, a magnetic field may be distributed as illustrated in FIG. 4A. For example, the target resonator may receive wireless power from a source resonator via magnetic coupling. The received wireless power induces a current in the target resonator. The induced current in the target resonator generates a magnetic field, which induces a current in the feeder. If the target resonator is connected to the feeder as illustrated in FIG. 4A, a direction of the induced current flowing in the target resonator will be the same as a direction of the induced current flowing in the feeder. Accordingly, for the reasons discussed above in connection with FIG. 4A, a strength of the total magnetic field will increase inside the feeder, and will decrease in a region between the feeder and the target resonator.

Method of Automatically Configuring Network of PTU>

Hereinafter, a "source", a "wireless power transmitter", a "Tx", and a "power transmitting unit (PTU)" may be referred to as a "PTU" for ease of description and conciseness. Also, a "target", a "wireless power receiver", an "Rx", and a "power receiving unit (PRU)" may be referred to as a "PRU". A PTU operating in a master mode may be referred to as a "master device", and a PTU operating in a slave mode may be referred to as a "slave device".

The master device may be network-connected to at least one slave device. Network-connection refers to configuring a network for transmitting and/or receiving data between devices. In a network, the master device may be a controller of the slave device. The slave device may be subject to control of the master device. The slave device may be synchronized to a sequential order and a time of frequency hopping of the master device. Accordingly, conflicts or overlap among a plurality of other slave devices present in the network may not occur because the plurality of other slave devices may transmit and/or receive data during respective predetermined periods of time based on the control of the master device.

Figure 5:
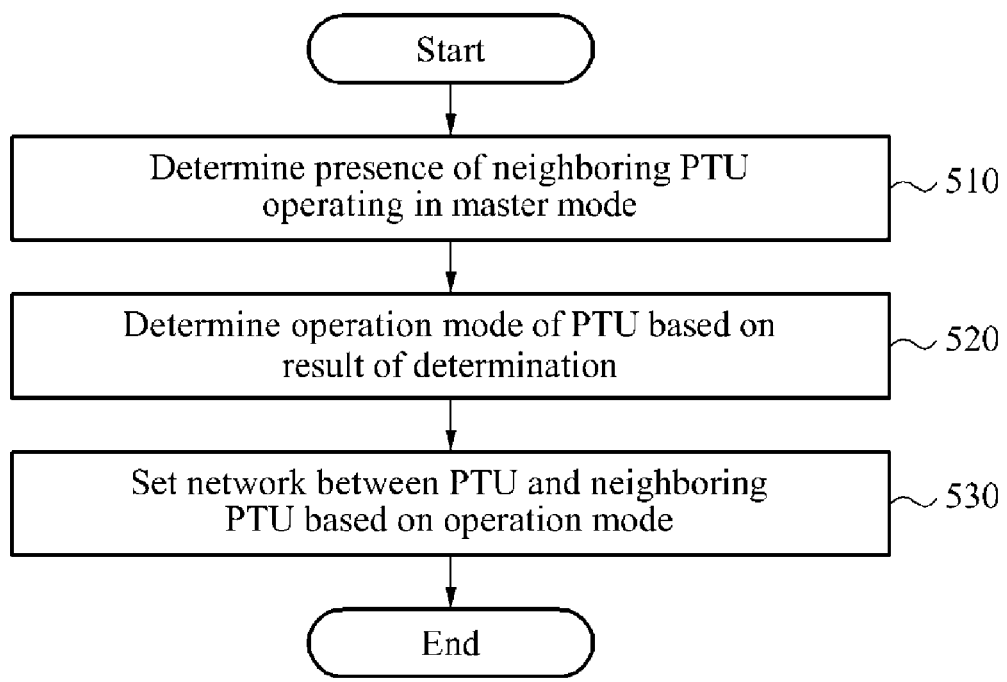
FIG. 5 illustrates an example of a method of automatically configuring a network of a power transmitting unit (PTU).

FIG. 5 illustrates an example of a method of automatically configuring a network of a PTU.

Referring to FIG. 5, in 510, the method of automatically configuring the network of the PTU includes determining a presence of a neighboring PTU operating in a master mode. The neighboring PTU is a PTU present in vicinity of a PTU. There may be a plurality of neighboring PTUs. Operation modes of the PTU include a master mode and a slave mode.

When power is supplied to the PTU, the PTU searches for a presence of a neighboring master device. For example, the PTU may transmit or receive a search signal using out-of-band communication to search for the presence of the neighboring master device. The search signal may include an advertisement signal or an inquiry signal.

In one example, when power is supplied to the PTU, the PTU may perform an initial operation in a master mode, and may transmit a search signal to the neighboring PTU. The PTU may periodically broadcast the search signal. When a response signal responding to the search signal is received from the neighboring PTU, the PTU determines that the neighboring master device is present. When a response signal responding to the search signal is not received from the neighboring PTU, the PTU determines that the neighboring master device is absent.

In another example, when power is supplied to the PTU, the PTU may perform an initial operation in a slave mode, and may receive a search signal from the neighboring PTU. When the search signal is received, the PTU determines that the neighboring master device is present. When the search signal is not received, the PTU determines that the neighboring master device is absent.

In 520, the method of automatically configuring the network of the PTU includes determining an operation mode of the PTU based on a result of the determination in 510. In 520, the PTU sets the operation mode of the PTU to a slave mode when the PTU determines in 510 that a neighboring master device is present. Accordingly, the PTU may operate as a slave device of the master device. Also, the PTU may operate as a master device by setting the operation mode of the PTU to a master mode when the PTU determines in 510 that the neighboring master device is absent.

In 530, the method of automatically configuring the network of the PTU includes setting up a network between the PTU and the neighboring PTU based on the operation mode of the PTU determined in 520. By configuring the network between the PTUs in 530, communication channel control, multi-charging interference, information management, customer management, or a payment service may efficiently be performed, and cross connection may be prevented. As used herein, cross connection refers to a communication connection error occurring due to a condition in which PTUs are concentrated in a small area.

In 530, when an operation mode of the PTU is a master mode, the PTU periodically monitors a presence of a neighboring slave device. When the neighboring slave device is detected, the PTU transmits a connection request signal to the detected neighboring slave device. The connection request signal may include a connecting request signal or a paging signal. When a response signal responding to the connection request signal is received from the neighboring slave device, the PTU is network-connected to the neighboring slave device. Accordingly, the PTU may be a controller of the neighboring slave device.

When the operation mode of the PTU is a slave mode, the PTU may receive a connection request signal from a master device. The PTU responds to the reception of the connection request signal by transmitting a response signal responding to the connection request signal, and is network-connected to the master device.

Also, the method of automatically configuring the network of the PTU may include setting an index for either one or both of a PTU and a neighboring PTU. The index refers to an indication for numbering the slave device. When the operation mode of the PTU is a master mode, the master device may transmit information on an index to a neighboring slave device. When there are a plurality of neighboring slave devices, the PTU may generate the information on the index based on a sequential order in which the plurality of neighboring slave devices are network-connected to the PTU. In this instance, the information on the index of the plurality of neighboring slave devices may be shared by the plurality of neighboring slave devices, and by the PRU network-connected to the plurality of neighboring slave devices. In one example, when a first slave device is network-connected to the PTU, and then a second slave device is network-connected to the PTU, the PTU may set information on an index of the first slave device to "1", and set information on an index of the second slave device to "2".

When the operation mode of the PTU is a slave mode, the PTU may receive the information on the index from the master device, and set an index of the PTU based on the information on the index. The information on the index of the PTU may be shared by the PTU and a PTU connected to another slave device.

When the operation mode of the PTU is the slave mode, and the master device network-connected to the PTU is turned off or removed, the PTU may compare indices of the PTU and the plurality of neighboring slave devices. When the index of the PTU is higher than the indices of the plurality of neighboring slave devices, the PTU may set the operation mode of the PTU to a master mode. As the PTU becomes a master device, the PTU may be network-connected to a slave device and be a controller of the slave device.

Also, the method of automatically configuring the network of the PTU may include searching for a host when an operation mode of the PTU is a master mode. The host may be any device capable of configuring a network, such as a laptop computer, a personal computer (PC), or a server. In one example, the PTU may store information on a host to be network-connected to the PTU. For example, when the PTU performs a payment service, the PTU may store the information on the host for performing the payment service, and search for the host for performing the payment service among a plurality of hosts. When the host is found, the PTU may be network-connected to the found host. The PTU may perform wired communication or wireless communication with the found host, enabling the PTU to transmit data to and/or receive data from the found host. In particular, the PTU may transmit and/or receive data related to a host and a service to provide services such as payment management, customer management, information management, and any other desired service. In one example, the host may or may not operate as a master device with respect to the PTU. Also, at least one master device may be network-connected to a single host.

In another example, when a neighboring PTU operating in a master mode that is network-connected to a host exists, the PTU may change an operation mode of the PTU to a slave mode to be network-connected to a neighboring PTU operating in a master mode. The PTU may be subject to control of the neighboring PTU operating in the master mode, and transmit data to and/or receive data from the host via the neighboring PTU operating in the master mode.

FIGS. 6A through 6E illustrate examples of a method of automatically configuring a network of a PTU.

Figure 6A:
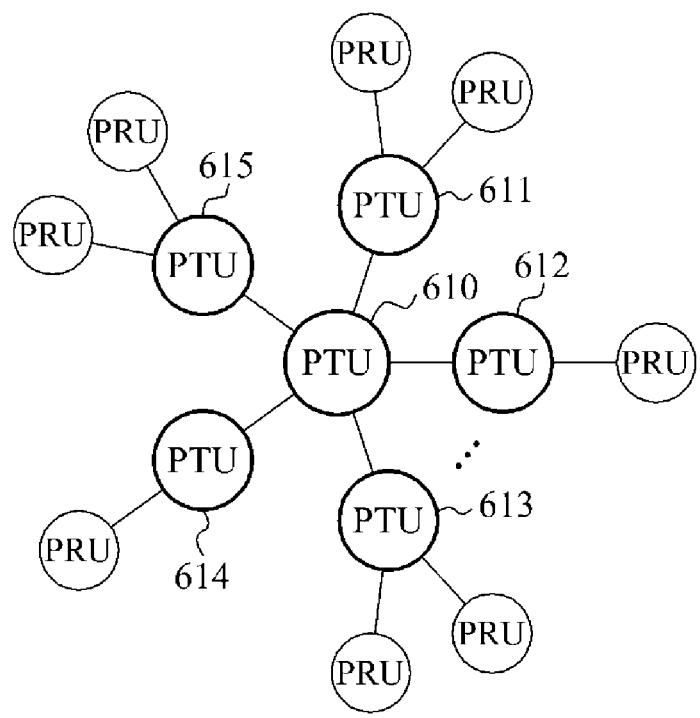
FIGS. 6A through 6E illustrate examples of a method of automatically configuring a network of a PTU.
Figure 6B:
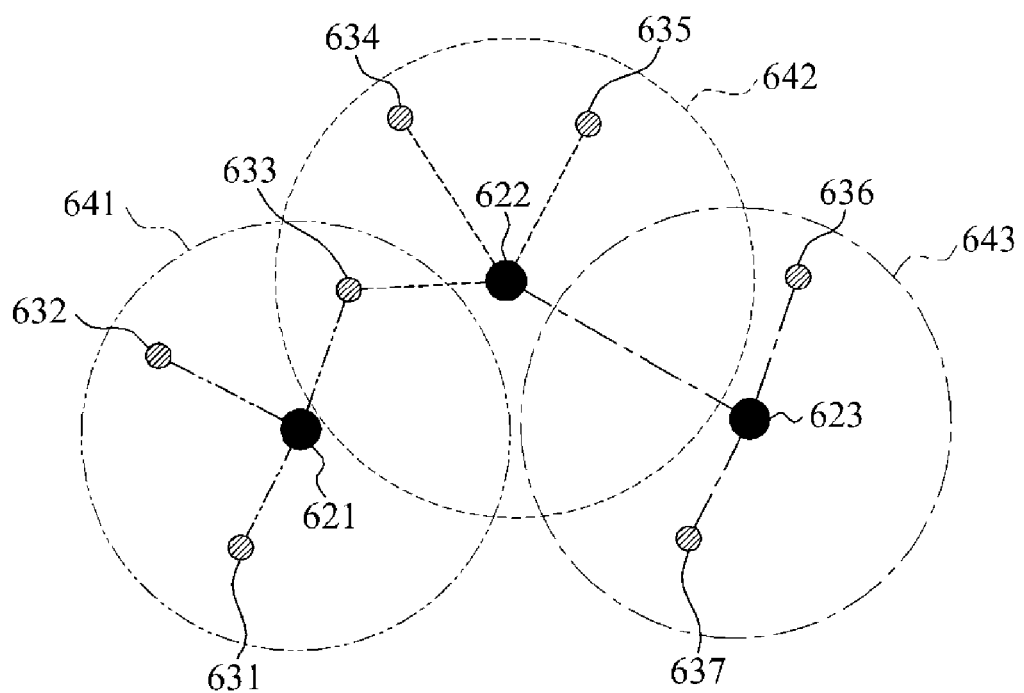

Referring to FIGS. 6A and 6B, a piconet is illustrated in FIG. 6A, and a scatternet is illustrated in FIG. 6B. As used herein, a piconet is a network in which at least one slave device is connected to a single master device, and a scatternet is a network in which a plurality of piconets are mutually connected.

In FIG. 6A, a master device 610 is network-connected to a plurality of slave devices 611 through 615. In the piconet, the master device 610 is a controller of the plurality of slave devices 611 through 615, and the plurality of slave devices 611 through 615 are synchronized to a sequential order and a time of frequency hopping of the master device 610.

Each of the plurality of slave devices 611 through 615 may be connected to a PRU to supply power to the PRU, and to transmit data to and/or receive data from the PRU. Also, although not shown in the drawings, a PRU may be connected to the master device 610. Any of the master device 610 and the plurality of slave devices 611 to 615 may be connected to more than one PRU.

In FIG. 6B, a plurality of piconets 641 through 643 are mutually connected to configure a scatternet. The first piconet 641 includes a master device 621 and a plurality of slave devices 631 through 633, the second piconet 642 includes a master device 622 and a plurality of slave devices 633 through 635, and the third piconet 643 includes a master device 623 and a plurality of slave devices 636 and 637. In the example in FIG. 6B, the slave device 633 is included in both the first piconet 641 and the second piconet 642. In particular, the slave device 633 may be subject to control of both the master device 621 and the master device 622, or subject to control of either one of the master devices 621 and 622 based on a predetermined rule.

Figure 6C:
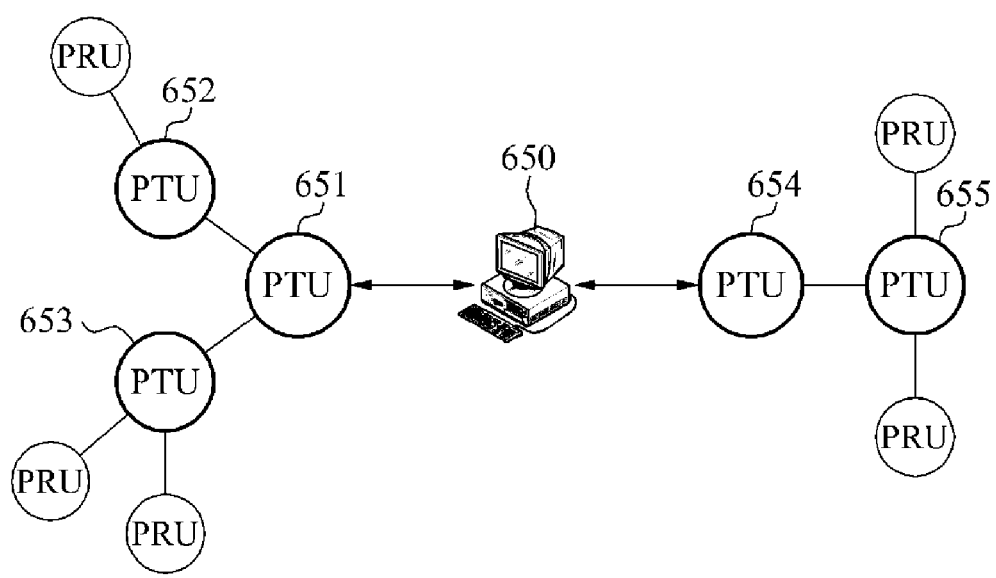

Referring to FIG. 6C, a master device 651 is network-connected to a plurality of slave devices 652 and 653. The master device 651 may search for a host 650. In one example, the master device 651 may include information on a host that may be network-connected to the master device 651, and search for the host that may be network-connected to the master device 651 among a plurality of hosts. When the master device 651 finds the host 650, the master device 651 may be network-connected to the host 650. Accordingly, the master device 651 may transmit data to and/or receive data from the host 650.

A master device 655 may also search for the host 650. In this example, a master device 654 that is already network-connected to the host 650 exists. In this instance, the master device 655 may change its operation mode to a slave mode to be network-connected to the master device 654. The PTU that was the master device 655 and has changed its operation mode to the slave mode may be subject to control of the master device 654, and transmit data to and/or receive data from the host 650 via the master device 654.

Figure 6D:
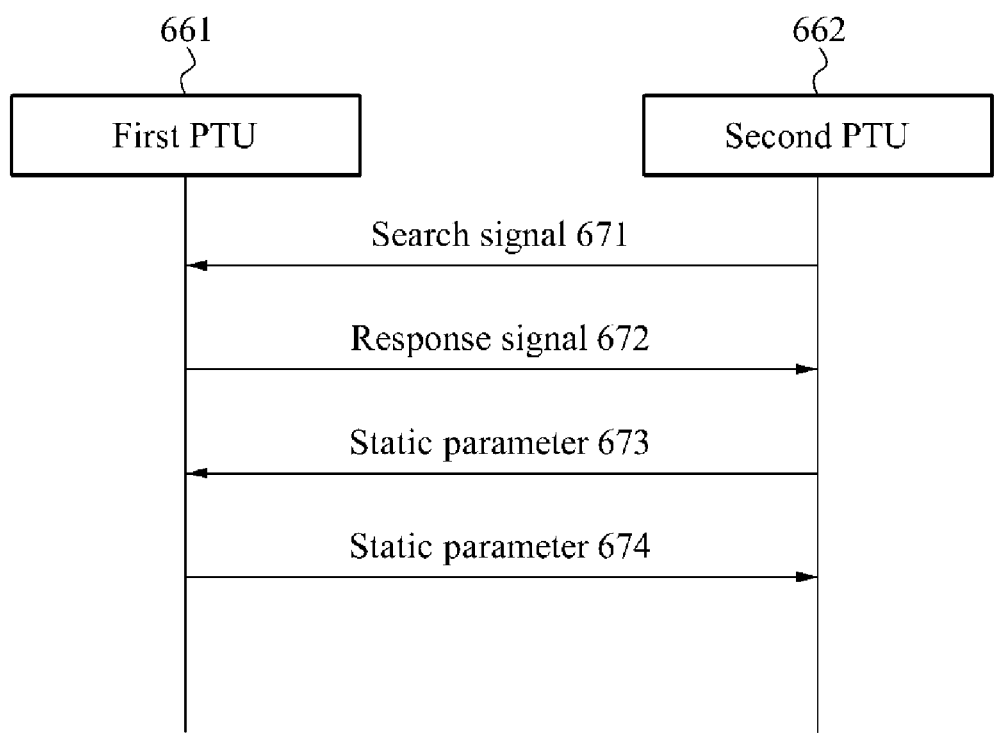

Referring to FIG. 6D, when power is supplied to a second PTU 662, the second PTU 662 performs an initial operation in a master mode. In one example, the second PTU 662 is supplied with power by wake-up power received from a master device. The second PTU 662 transmits or broadcasts a search signal 671 to a first PTU 661. The search signal 671 may be an advertisement signal. In one example, the second PTU 662 may continuously transmit or broadcast the search signal 671 until a connection request signal is received from the master device. In response to the reception of the search signal 671, the first PTU 661 transmits a response signal 672 responding to the search signal 671 to the second PTU 662. The response signal 672 may be a connection request signal. When the response signal 672 is received from the first PTU 661, the second PTU 662 determines that the first PTU 661 is a master device, and sets an operation mode of the second PTU 662 to a slave mode. The second PTU 662 operating in the slave mode transmits a static parameter 673 to the first PTU 661, and in response to the transmission, the first PTU 661 transmits a static parameter 674 to the second PTU 662. The static parameter may include any one or any combination of information on a power of a PTU (PTU power), information on a maximum source impedance of a PTU (PTU max source impedance), information on a maximum load resistance of a PTU (PTU max load resistance), information on an identification (ID) of a PTU (PTU ID), information on a class of a PTU (PTU class), information on a hardware revision of a PTU (hardware rev), information on a firmware revision of a PTU (firmware rev), information on a protocol revision of a PTU (protocol rev), and information on a maximum number of supported PRUs of a PTU (# devices supported). Via an exchange of the static parameters 673 and 674, the first PTU 661 may operate as a master device, and the second PTU 662 may operate as a slave device.

Figure 6E:
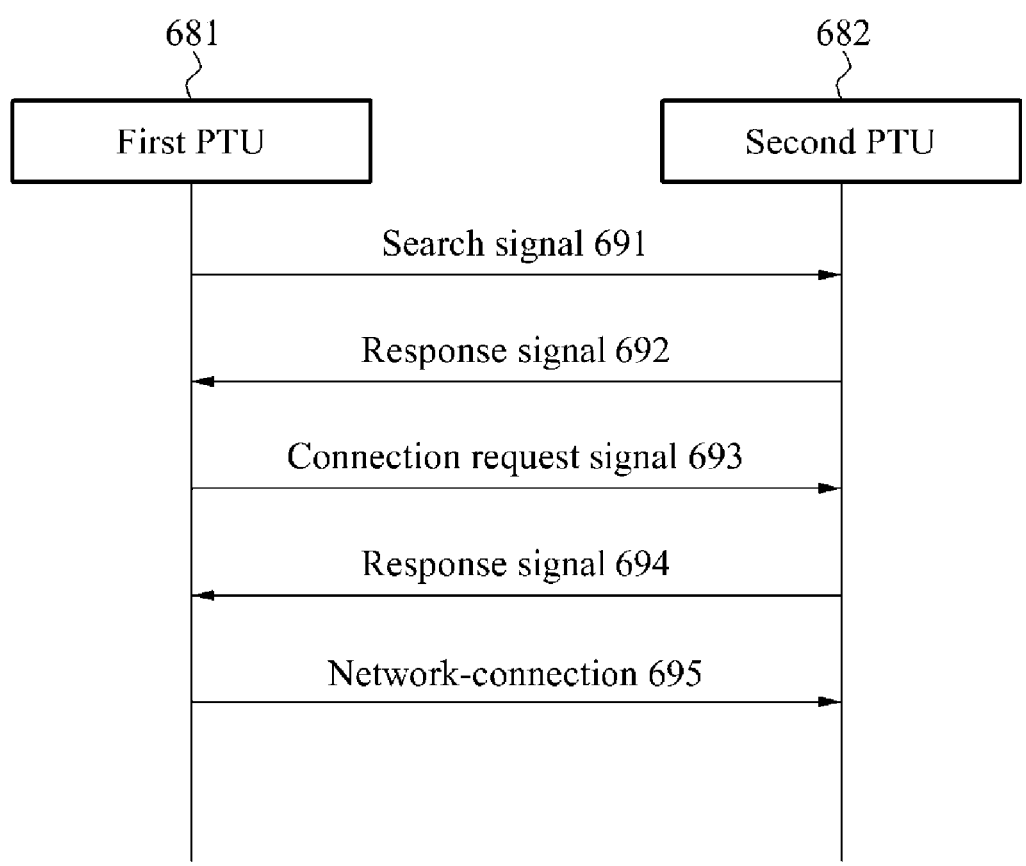

Referring to FIG. 6E, when power is supplied to a second PTU 682, the second PTU 682 receives a search signal 691 from a neighboring first PTU 681. In this instance, the second PTU 682 performs an initial operation as a slave device. The search signal 691 may be an inquiry signal. When the received search signal 691 is absent, the second PTU 682 determines that a neighboring master device is absent. When the search signal 691 is received from the first PTU 681, the second PTU 682 transmits a response signal 692 responding to the search signal 691 to the first PTU 681. The response signal 692 may include information on the second PTU 682. In response to the reception of the response signal 692, the first PTU 681 transmits a connection request signal 693 to the second PTU 682, and the second PTU 682 transmits a response signal 694 responding to the connection request signal 693 to the first PTU 681. The connection request signal 693 may be a paging signal. When the information on the second PTU 682 satisfies a predetermined condition, the first PTU 681 is network-connected to the second PTU 682 as indicated by 695. Therefore, the first PTU 681 operating as a master device may be a controller of the second PTU 682 operating as a slave device, and transmit and/or receive data.

Method of Randomly Configuring Network of PTU

Figure 7:
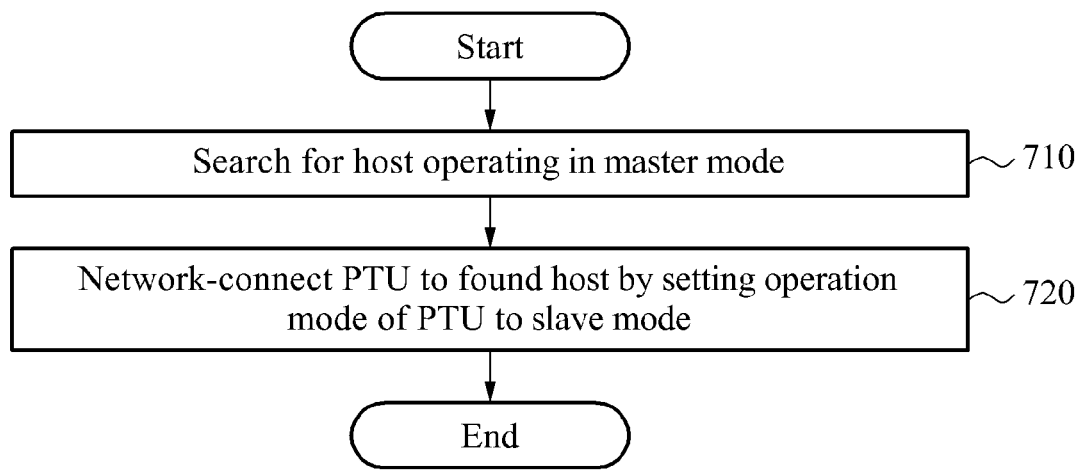
FIG. 7 illustrates an example of a method of randomly configuring a network of a PTU.

FIG. 7 illustrates an example of a method of randomly configuring a network of a PTU.

Referring to FIG. 7, in 710, the method of randomly configuring the network of the PTU includes searching for a host operating in a master mode. As used herein, the host may be any device capable of configuring a network, such as a laptop computer, a PC, or a server. The PTU may perform wired communication or wireless communication with the found host. In one example, the PTU transmits a search signal to a device for performing wired communication or wireless communication with the PTU, and recognizes a device responding to the search signal as a host.

In 720, the method of randomly configuring the network of the PTU includes network-connecting the PTU to the found host by setting an operation mode of the PTU to a slave mode. In 720, the host operates as a master device. As a result, the PTU operates as a slave device to be network-connected to the host. When the PTU is network-connected to the host, the PTU may be synchronized to a sequential order and a time of frequency hopping of the host. Also, the PTU may be subject to control of the host, and information on the PTU may be transmitted to the host.

In one example, the host may control a neighboring PTU operating in a master mode. The PTU may search for the neighboring PTU operating in the master mode. For example, the PTU may transmit a search signal to a neighboring PTU or receive a search signal to search for the neighboring PTU operating in the master mode. When the neighboring PTU operating in the master mode is found, the PTU operate as a relay between the host and the found neighboring PTU to enable the found neighboring PTU to operate in a slave mode with respect to the host. In particular, the host may transmit a control signal for the found neighboring PTU to the PTU, and the PTU may transmit the received control signal to the neighboring PTU. Accordingly, the host may be a controller of the found neighboring PTU.

Figure 8A:
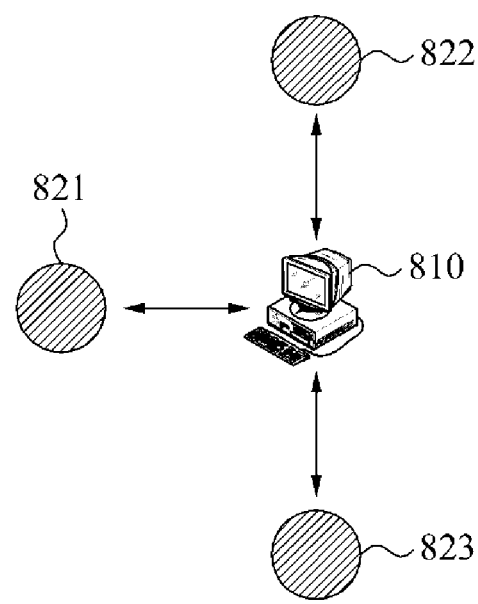
FIGS. 8A and 8B illustrate examples of a method of randomly configuring a network of a PTU.
Figure 8B:
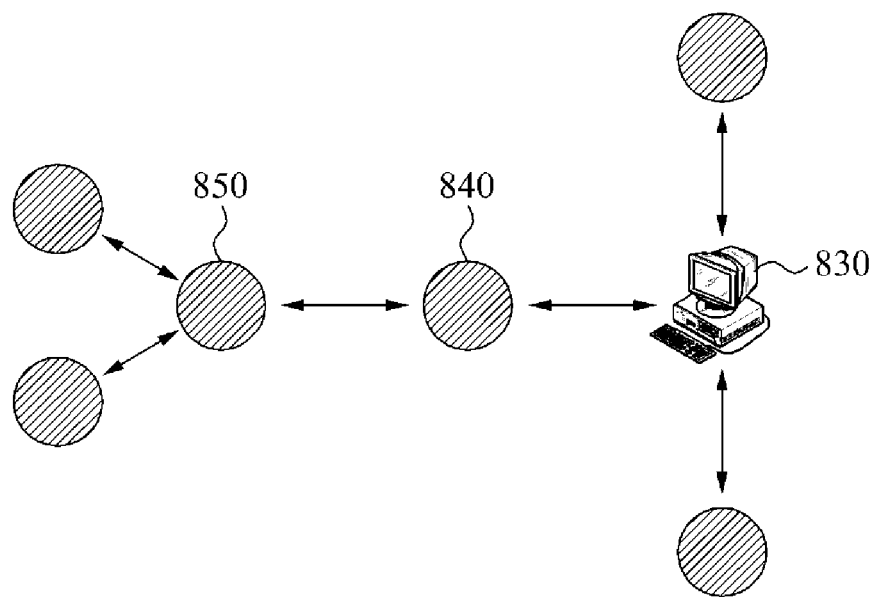

FIGS. 8A and 8B illustrate examples of a method of randomly configuring a network of a PTU.

Referring to FIG. 8A, a host 810 is network-connected to a plurality of PTUs 821 through 823. The host 810 and the plurality of PTUs 821 through 823 may perform wired communication or wireless communication. The host 810 operates as a master device, and the plurality of PTUs 821 through 823 each operate as a slave device. The host 810 may transmit a synchronization signal to the plurality of PTUs 821 through 823 so that the plurality of PTUs 821 through 823 are synchronized to a sequential order and a time of frequency hopping of the host 810. Also, the host 810 and the plurality of PTUs 821 through 823 may exchange data with one another, and the plurality of PTUs 821 through 823 may share the data with one another.

Referring to FIG. 8B, a host 830 is network-connected to a PTU 840. A PTU 850 is a master device that is not network-connected to the host 830. The PTU 840 searches for the PTU 850, receives a control signal from the host 830, and relays the control signal to the PTU 850. Accordingly, the PTU 850 may operate in a slave mode with respect to the host 830, and may be subject to control of the host 830.

Method of Configuring Network of PTU Using Received Signal Strength Indicator (RSSI)

Figure 9:
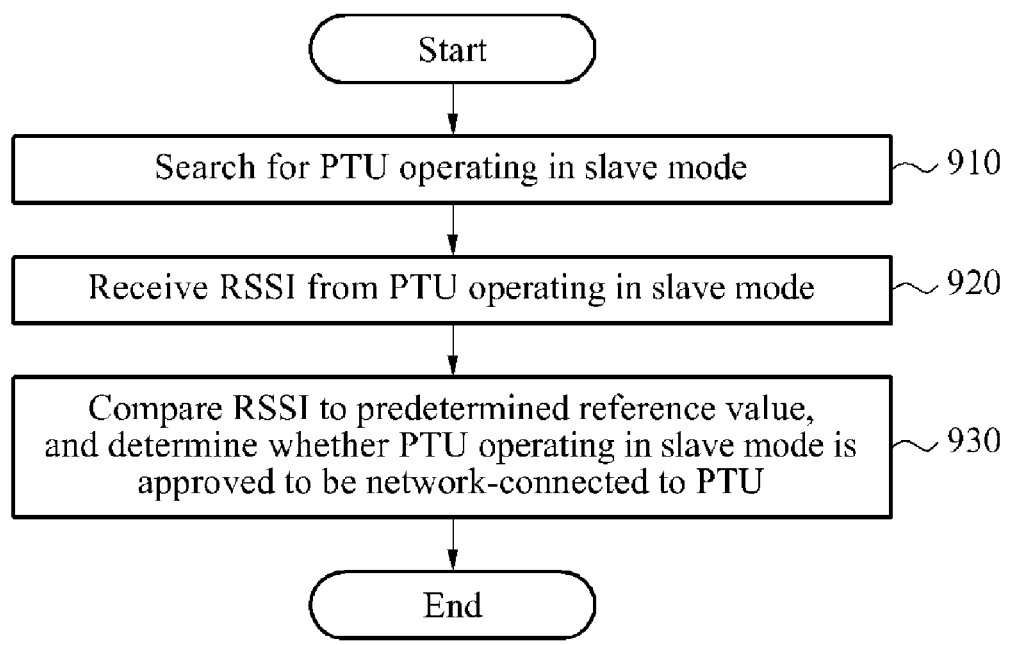
FIG. 9 illustrates an example of a method of configuring a network of a PTU using a received signal strength indicator (RSSI).

FIG. 9 illustrates an example of a method of configuring a network of a PTU using an RSSI.

Referring to FIG. 9, in 910, the method of configuring the network of the PTU using the RSSI includes searching for a PTU operating in a slave mode. In 910, the PTU operates in a master mode, and transmits or broadcasts a search signal to a neighboring PTU using out-of-band communication. When a response signal responding to the search signal is received from the neighboring PTU that received the search signal, the PTU determines that the neighboring PTU is operating in a slave mode. The PTU may continuously monitor a presence of a PTU operating in a slave mode.

Also, in 920, the method of configuring the network of the PTU using the RSSI includes receiving an RSSI from the neighboring PTU operating in the slave mode. A slave device may measure an RSSI with respect to a master device PTU, and transmit the measured RSSI to the master device PTU. A PTU connected to the slave device and another slave device may share the RSSI of the slave device.

Also, in 930, the method of configuring the network of the PTU using the RSSI includes comparing the RSSI received from the neighboring PTU operating in the slave mode to a predetermined reference value, and determining whether the neighboring PTU operating in the slave mode is approved to be network-connected to the PTU to prevent cross connection.

The closer a distance between the PTU and the neighboring PTU operating in the slave mode, the greater the RSSI. The farther the distance between the PTU and the neighboring PTU operating in the slave mode, the less the RSSI.

In 930, the RSSI being greater than the predetermined reference value indicates that the distance between the PTU and the neighboring PTU operating in the slave mode is sufficiently close to configure a network. Accordingly, when the RSSI is greater than the predetermined reference value, the PTU approves the network-connection between the neighboring PTU operating in the slave mode and the PTU.

Conversely, the RSSI being less than the predetermined reference value indicates that the distance between the PTU and the neighboring PTU operating in the slave mode is too far to configure a network. Therefore, when the RSSI is less than the predetermined reference value, the PTU disapproves the network-connection between the neighboring PTU operating in the slave mode and the PTU.

Figure 10:
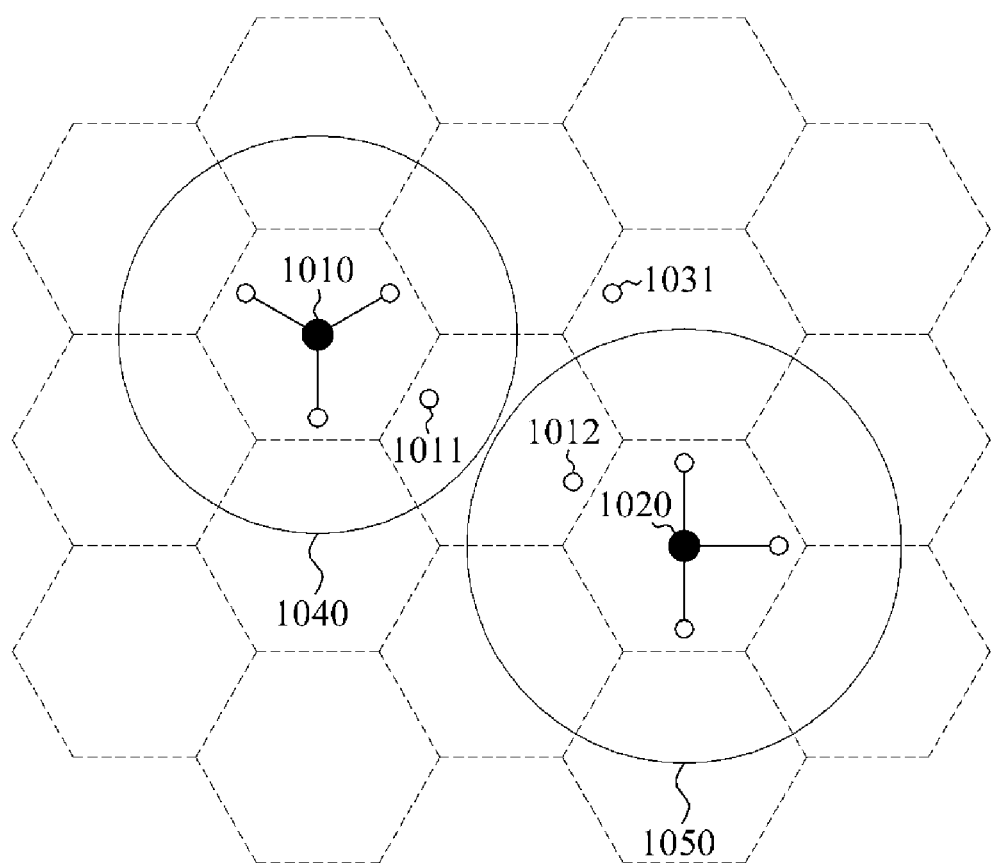
FIG. 10 illustrates an example of a method of configuring a network of a PTU using an RSSI.

FIG. 10 illustrates an example of a method of network configuration of a PTU using an RSSI.

Referring to FIG. 10, a master device 1010 is network-connected to a plurality of slave devices present in a same cell as the master device 1010, and a master device 1020 is network-connected to a plurality of slave devices present in a same cell as the master device 1020. A first region 1040 and a second region 1050 may include an entire cell or a portion thereof, respectively. A boundary of the first region 1040 and the second region 1050 may be set by a predetermined reference value. An RSSI of a slave device present in the first region 1040 and the second region 1050 may be greater than a predetermined reference value, and an RSSI of a slave device present outside the first region 1040 and the second region 1050 may be less than the predetermined reference value.

An RSSI of the slave device 1011 and the slave device 1012 is greater than a predetermined reference value because the slave device 1011 and the slave device 1012 exist in the first region 1040 and the second region 1050, respectively. Accordingly, the master device 1010 and the master device 1020 may be network-connected to the slave device 1011 and the slave device 1012, respectively. Conversely, an RSSI of the slave device 1031 is less than the predetermined reference value because the slave device 1031 exists outside the first region 1040 and the second region 1050. Thus, the slave device 1031 may not be network-connected to the master device 1010 or the master device 1020.

Method of Configuring Network of PTU Using Wake-Up Power

Figure 11:
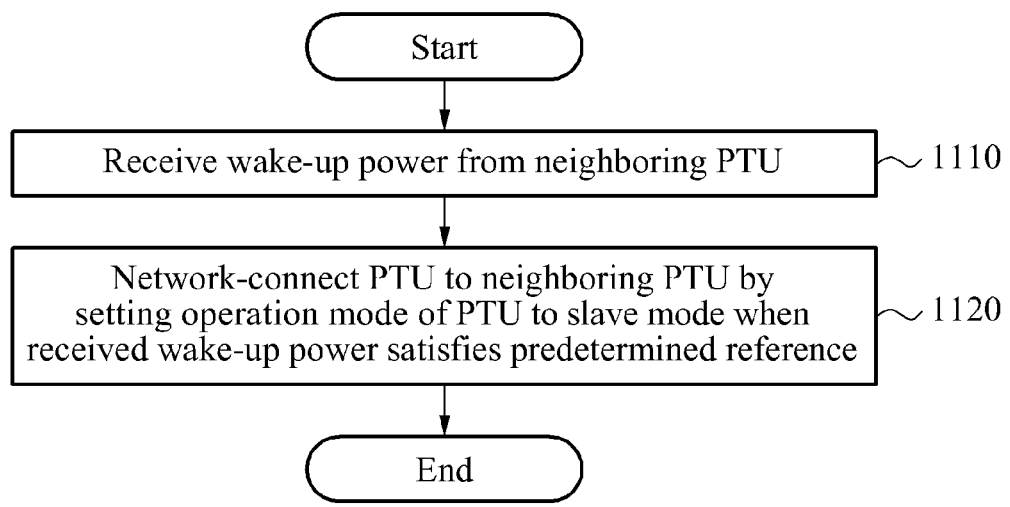
FIG. 11 illustrates an example of a method of configuring a network of a PTU using wake-up power.

FIG. 11 illustrates an example of a method of configuring a network of a PTU using wake-up power.

Referring to FIG. 11, in 1110, the method of configuring the network of the PTU using the wake-up power includes receiving wake-up power from a neighboring PTU. The wake-up power may include a beacon signal. In 1110, a PTU activates a communication and control function using the wake-up power. In one example, the PTU may receive the wake-up power from a plurality of neighboring PTUs.

In 1120, the method of configuring the network of the PTU using the wake-up power includes network-connecting the PTU to the neighboring PTU by setting an operation mode of the PTU to a slave mode when the received wake-up power satisfies a predetermined reference value to prevent cross connection. When the received wake-up power satisfies the predetermined reference value, the operation mode of the neighboring PTU may be a master mode. In this instance, the predetermined reference value may include either one or both of a predetermined size and a predetermined period. The PTU may transmit and/or receive the wake-up power using magnetic field coupling with the neighboring PTU. The magnetic field coupling decreases as a distance between the PTU and the neighboring PTU increases, and a size of the wake-up power received by the PTU decreases as the magnetic field coupling decreases, and thereby the period of the wake-up power may vary. Accordingly, the PTU may compare the received wake-up power to the predetermined reference value, and determine whether the neighboring PTU is disposed at a distance appropriate for the magnetic field coupling.

When the received wake-up power fails to satisfy the predetermined reference value, the PTU determines that the neighboring PTU is disposed at a distance inappropriate for the magnetic field coupling. Accordingly, the PTU does not perform network-connection with the neighboring PTU.

In one example, the PTU may transmit information on a change of the wake-up power to the neighboring PTU using out-of-band communication. The information on the change of the wake-up power may include either one or both of the information on the period of the wake-up power and the information on the size of the wake-up power. The neighboring PTU may adjust a size or a period of a current supplied to a resonator of the neighboring PTU to generate the wake-up power based on the received information on the change of the wake-up power. Accordingly, the neighboring PTU may transmit the wake-up power corresponding to the information on the change of the wake-up power to the PTU.

When the neighboring PTU is disposed at the distance appropriate for the magnetic field coupling, the PTU may receive the wake-up power corresponding to the information on the change of the wake-up power from the neighboring PTU. In response, the PTU may recognize the neighboring PTU as a master device, set an operation mode of the PTU to a slave mode, and network-connect the PTU to the neighboring PTU recognized as a master device.

When the neighboring PTU is disposed at the distance inappropriate for the magnetic field coupling, the PTU may receive wake-up power not corresponding to the information on the change of the wake-up power from the neighboring PTU. Accordingly, the PTU may not recognize the neighboring PTU as a master device, and may not perform network-connection with the neighboring PTU.

Figure 12:
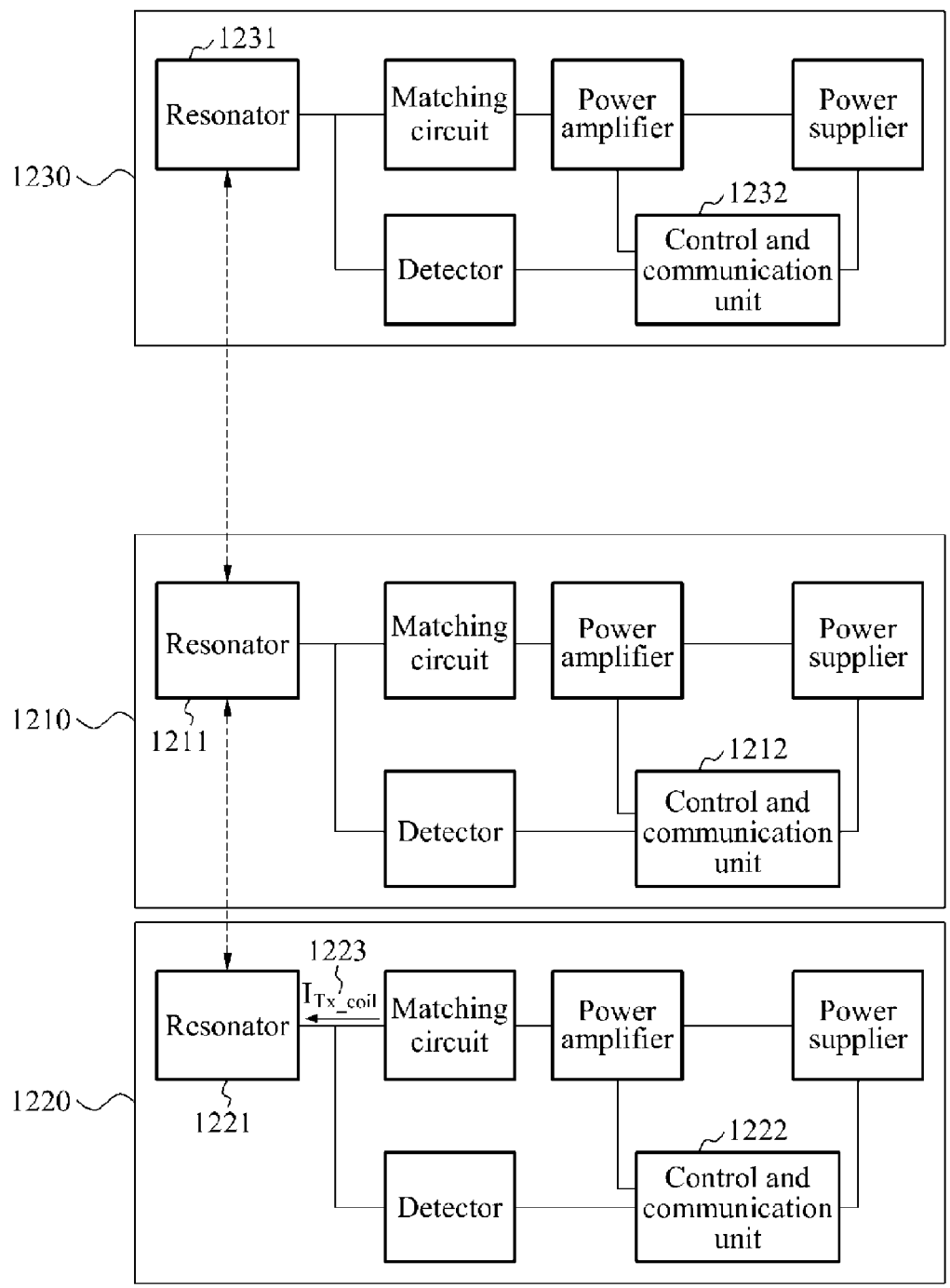
FIG. 12 illustrates an example of a method of network configuration of a PTU using wake-up power.

FIG. 12 illustrates a method of configuring a network of a PTU using wake-up power.

Referring to FIG. 12, a PTU 1210 is disposed at a distance appropriate for magnetic field coupling with a neighboring PTU 1220, but is disposed at a distance inappropriate for the magnetic field coupling with a neighboring PTU 1230.

In one example, the PTU 1210 receives wake-up power from a resonator 1221 and a resonator 1231 via a resonator 1211. The PTU 1210 determines whether the wake-up power satisfies a predetermined reference value, such as a predetermined size or a predetermined period. The wake-up power received from the resonator 1221 satisfies the predetermined reference value. In response, the PTU 1210 recognizes the neighboring PTU 1220 as a master device, sets an operation mode of the PTU 1210 to a slave mode, and network-connects the PTU 1210 to the neighboring PTU 1220. The wake-up power received from the resonator 1231 does not satisfy the predetermined reference value because the neighboring PTU 1230 is disposed at a distance inappropriate for the magnetic field coupling. As a result, the PTU 1210 does not recognize the neighboring PTU 1230 as a master device; and does not perform network-connection with the neighboring PTU 1230.

In another example, the PTU 1210 transmits information on a change of the wake-up power to a control and communication unit 1222 and a control and communication unit 1232 using out-of-band communication. The neighboring PTU 1220 adjusts a size or a period of a current ITx_coil 1223 supplied to the resonator 1221, and transmits wake-up power corresponding to the information on the change of the wake-up power to the PTU 1210. Accordingly, the PTU 1210 recognizes the neighboring PTU 1220 as a master device, sets an operation mode of the PTU 1210 to a slave mode, and network-connects the PTU 1210 to the neighboring PTU 1220.

The PTU 1210 does not receive the wake-up power corresponding to the information on the change of the wake-up power from the neighboring PTU 1230 because the neighboring PTU 1230 is disposed at the distance inappropriate for the magnetic field coupling with the PTU 1210. As a result, the PTU 1210 does not recognize the neighboring PTU 1230 as a master device; and does not perform network-connection with the neighboring PTU 1230.

Configuration of PTU

Figure 13:
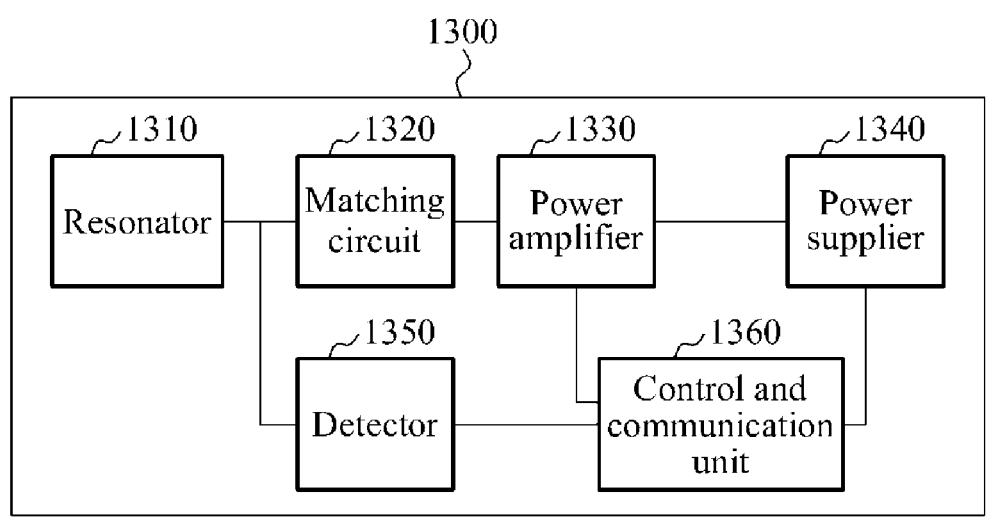
FIG. 13 illustrates an example of a configuration of a PTU.

FIG. 13 illustrates a configuration of a PTU.

Referring to FIG. 13, a PTU 1300 includes a resonator 1310, a matching circuit 1320, a power amplifier 1330, a power supplier 1340, a detector 1350, and a control and communication unit 1360.

The resonator 1310 performs magnetic field coupling with a resonator of a PTU or a PRU. Also, the resonator 1310 may transmit or receive wake-up power.

The matching circuit 1320 compensates for impedance mismatching with the PTU or impedance mismatching with the PRU to achieve optimal matching under the control of the control and communication unit 1360.

The power amplifier 1330 generates power by converting a direct current (DC) voltage having a predetermined level to an alternating current (AC) voltage under the control of the control and communication unit 1360.

The power supplier 1340 supplies power to the power amplifier 1330 under the control of the control and communication unit 1360.

The detector 1350 detects a current and a voltage flowing to the resonator 1310, and transmits information on the detected current and voltage to the control and communication unit 1360.

The control and communication unit 1360 may determine a presence of a neighboring PTU operating in a master mode, determine an operation mode of the PTU based on a result of the determination, and set a network between the PTU and the neighboring PTU based on the determined operation mode. Also, the control and communication unit 1360 may search for a host operating in a master mode, set an operation mode of the PTU to a slave mode, and connect the PTU to the found host. Also, the control and communication unit 1360 may detect a neighboring PTU operating in a slave mode, receive an RSSI from the neighboring PTU operating in the slave mode, compare the RSSI to a predetermined reference value, and determine whether network-connection of the PTU to the neighboring PTU operating in the slave move is approved. Also, the control and communication unit 1360 may network-connect the PTU to the neighboring PTU by setting an operation mode of the PTU to a slave mode when the received wake-up power satisfies the predetermined reference value.

Detailed descriptions with respect to the PTU of FIG. 13 will be omitted for conciseness because the descriptions provided with respect to FIGS. 1 through 12 are also applicable to the PTU of FIG. 13.

The Tx controller 114, the communicators 115 and 124, and the Rx controller 125 in FIG. 1, the control and communication units 1212, 1222, and 1232 in FIG. 12, and the control and communication unit 1360 in FIG. 13 described above may be implemented using one or more hardware components, one or more software components, or a combination of one or more hardware components and one or more software components.

A hardware component may be, for example, a physical device that physically performs one or more operations, but is not limited thereto. Examples of hardware components include resistors, capacitors, inductors, power supplies, frequency generators, operational amplifiers, power amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the following claims and their equivalents are to be construed as being included in the disclosure.

What is claimed is:

1. A method of configuring a network of a power transmitting unit (PTU), the method comprising:
   determining whether a neighboring PTU is operating in a master mode;
   determining an operation mode of a PTU based on a result of the determining;
   setting a network between the PTU and the neighboring PTU based on the operation mode of the PTU; and
   setting an index for either one or both of the PTU and the neighboring PTU, wherein a result of the determining of whether the neighboring PTU is operating in the master mode is that the neighboring PTU is operating in a slave mode;
   the setting of the index for the either one or both of the PTU and the neighboring PTU comprises transmitting information on an index to the neighboring PTU operating in the slave mode in response to an operation mode of the PTU being a master mode,
   wherein the neighboring PTU is one of a plurality of neighboring PTUs that are network-connected to the PTU, and
   the transmitting of the information on the index to the neighboring PTU operating in the slave mode comprises generating the information on the index based on a sequential order in which the plurality of neighboring PTUs were network-connected to the PTU.

2. The method of claim 1, wherein the determining of whether the neighboring PTU is operating in the master mode comprises:
   transmitting a search signal to the neighboring PTU; and
   determining that the neighboring PTU is operating in the master mode in response to receiving a response signal responding to the search signal from the neighboring PTU.

3. The method of claim 1, wherein the determining of whether the neighboring PTU is operating in the master mode comprises:
   determining whether a search signal is received from the neighboring PTU; and
   determining that the neighboring PTU is not operating in the master mode in response to not receiving the search signal from the neighboring PTU.

4. The method of claim 1, wherein the selecting of the wireless power transmission operation mode of the PTU based on the result of the determining comprises:
   setting the wireless power transmission operation mode of the PTU to a slave mode in response to a result of the determining being that the neighboring PTU is operating in the master mode; and
   setting the wireless power transmission operation mode of the PTU to a master mode in response to a result of the determining being that the neighboring PTU is not operating in the master mode.

5. The method of claim 1, wherein a result of the determining of whether the neighboring PTU is operating in the master mode is that the neighboring PTU is operating in a slave mode; and
   the setting of the network between the PTU and the neighboring PTU based on the wireless power transmission operation mode of the PTU comprises:
   transmitting a connection request signal to the neighboring PTU operating in the slave mode in response to the wireless power transmission operation mode of the PTU being a master mode; and
   network-connecting the PTU to the neighboring PTU operating in the slave mode in response to receiving a response signal responding to the connection request signal from the neighboring PTU operating in the slave mode.

6. The method of claim 1, wherein a result of the determining of whether the neighboring PTU is operating in the master mode is that the neighboring PTU is operating in the master mode; and
   the configuring of the data network between the PTU and the neighboring PTU based on the wireless power transmission operation mode of the PTU comprises:
   receiving a connection request signal from the neighboring PTU operating in the master mode in response to the wireless power transmission operation mode of the PTU being a slave mode; and
   transmitting a response signal responding to the connection request signal to the neighboring PTU operating in the master mode.

7. The method of claim 1, wherein a result of the determining of whether the neighboring PTU is operating in the master mode is that the neighboring PTU is operating in the master mode; and
   the setting of the index for the either one or both of the PTU and the neighboring PTU comprises:
   receiving information on an index from the neighboring PTU operating in the master mode in response to the wireless power transmission operation mode of the PTU being a slave mode; and
   setting the index of the PTU based on the information on the index.

8. The method of claim 1, further comprising:
   searching for a host in response to the wireless power transmission operation mode of the PTU being a master mode; and
   configuring a data network between the PTU and the host found in the searching, the configuring of the data network being performed in response to the host operating in the master mode being found in the searching.

9. The method of claim 8, wherein the network-connecting of the PTU to the host found in the searching comprises network-connecting the PTU to the neighboring PTU operating in the master mode by setting the wireless power transmission operation mode of the PTU to a slave mode when the neighboring PTU operating in the master mode that is network-connected to the host is present.

10. A method of configuring a network of a power transmitting unit (PTU), the method comprising:
    determining whether a neighboring PTU is operating in a master mode;
    determining an operation mode of a PTU based on a result of the determining; and
    setting a network between the PTU and the neighboring PTU based on the operation mode of the PTU;
    setting an index for either one or both of the PTU and the neighboring PTU, wherein a result of the determining of whether the neighboring PTU is operating in the master mode is that the neighboring PTU is operating in the master mode, wherein there is also a neighboring PTU operating in a slave mode;

comparing an index of the PTU to an index of the neighboring PTU operating in the slave mode in response to the neighboring PTU operating in the master mode being removed; and setting the operation mode of the PTU to the master mode in response to the index of the PTU being higher than the index of the neighboring PTU operating in the slave mode.

11. The method of claim 10, wherein the determining of whether the neighboring PTU is operating in the master mode comprises:

transmitting a search signal to the neighboring PTU; and determining that the neighboring PTU is operating in the master mode in response to receiving a response signal responding to the search signal from the neighboring PTU.

12. The method of claim 10, wherein the determining of whether the neighboring PTU is operating in the master mode comprises:

determining whether a search signal is received from the neighboring PTU; and determining that the neighboring PTU is not operating in the master mode in response to not receiving the search signal from the neighboring PTU.

13. The method of claim 10, wherein the selecting of the wireless power transmission operation mode of the PTU based on the result of the determining comprises:

setting the wireless power transmission operation mode of the PTU to a slave mode in response to a result of the determining being that the neighboring PTU is operating in the master mode; and setting the wireless power transmission operation mode of the PTU to a master mode in response to a result of the determining being that the neighboring PTU is not operating in the master mode.

14. The method of claim 10, wherein a result of the determining of whether the neighboring PTU is operating in the master mode is that the neighboring PTU is operating in a slave mode; and the setting of the network between the PTU and the neighboring PTU based on the wireless power transmission operation mode of the PTU comprises:

transmitting a connection request signal to the neighboring PTU operating in the slave mode in response to the wireless power transmission operation mode of the PTU being a master mode; and network-connecting the PTU to the neighboring PTU operating in the slave mode in response to receiving a response signal responding to the connection request signal from the neighboring PTU operating in the slave mode.

15. The method of claim 10, wherein a result of the determining of whether the neighboring PTU is operating in the master mode is that the neighboring PTU is operating in the master mode; and the configuring of the data network between the PTU and the neighboring PTU based on the wireless power transmission operation mode of the PTU comprises:

receiving a connection request signal from the neighboring PTU operating in the master mode in response to the wireless power transmission operation mode of the PTU being a slave mode; and transmitting a response signal responding to the connection request signal to the neighboring PTU operating in the master mode.

16. The method of claim 10, wherein a result of the determining of whether the neighboring PTU is operating in the master mode is that the neighboring PTU is operating in the master mode; and the setting of the index for the either one or both of the PTU and the neighboring PTU comprises:

receiving information on an index from the neighboring PTU operating in the master mode in response to the wireless power transmission operation mode of the PTU being a slave mode; and setting the index of the PTU based on the information on the index.

17. The method of claim 10, further comprising:

searching for a host in response to the wireless power transmission operation mode of the PTU being a master mode; and configuring a data network between the PTU and the host found in the searching, the configuring of the data network being performed in response to the host operating in the master mode being found in the searching.

18. The method of claim 17, wherein the network-connecting of the PTU to the host found in the searching comprises network-connecting the PTU to the neighboring PTU operating in the master mode by setting the wireless power transmission operation mode of the PTU to a slave mode when the neighboring PTU operating in the master mode that is network-connected to the host is present.

* * * * *